(12) United States Patent
Gray et al.

(10) Patent No.: US 10,524,118 B1
(45) Date of Patent: *Dec. 31, 2019

(54) APPARATUS, SYSTEM AND METHOD FOR DEVICE ACTIVATION

(71) Applicant: Omnicharge, Inc., Los Angeles, CA (US)

(72) Inventors: Gavin Gray, Marana, AZ (US); Jennie Souiade, Brooklyn, NY (US); Bryan Bozzi, Cambridge, MA (US)

(73) Assignee: Omnicharge, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,967

(22) Filed: May 20, 2019

Related U.S. Application Data

(62) Division of application No. 15/614,756, filed on Jun. 6, 2017, now Pat. No. 10,349,269.

(60) Provisional application No. 62/346,083, filed on Jun. 6, 2016, provisional application No. 62/358,598, filed on Jul. 6, 2016, provisional application No. 62/439,419, filed on Dec. 27, 2016.

(51) Int. Cl.
*H04W 8/26* (2009.01)
*H04W 8/18* (2009.01)
*H04W 4/50* (2018.01)
*H04W 4/21* (2018.01)

(52) U.S. Cl.
CPC ............. *H04W 8/265* (2013.01); *H04W 8/18* (2013.01); *H04W 4/21* (2018.02); *H04W 4/50* (2018.02)

(58) Field of Classification Search
CPC ...... G06Q 30/06; H04W 8/18; H04L 63/0428
USPC .......... 455/558, 411, 456.3, 414.4; 709/224, 709/217, 203, 229; 705/26.1, 306
See application file for complete search history.

(56) References Cited

U.S. PATENT DOCUMENTS 6,665,549 B1   12/2003   Reed
6,823,459 B1   11/2004   Horikoshi et al.
8,618,770 B2   12/2013   Baarman
(Continued)

FOREIGN PATENT DOCUMENTS

GB      2528911 A       10/2016
WO      2016020645 A1    2/2016

OTHER PUBLICATIONS

International Search Report and Written Opinion, dated Mar. 9, 2018, for International Application No. PCT/US2017/068545.

*Primary Examiner* — Kiet M Doan
(74) *Attorney, Agent, or Firm* — Rhodes Donahoe, LLC; Robert V. Donahoe

(57) ABSTRACT

A method to engage an individual with digital content to activate a device to deliver a service. The device is configured to operate in at least one state in which the device is configured to provide the service. The method includes: wirelessly receiving, with the device operating in a first state that prevents a delivery of the service, a request from a requestor to activate the device to provide the service; offering the requestor an opportunity to place the device in a second state following their engagement with the digital content, the device configured to provide the service when in the second state; if the requestor chooses to engage with the digital content, wirelessly communicating digital content for engagement by the requestor; and changing the state of the device to the second state to allow the device to be used to provide the service following a completion of the engagement.

18 Claims, 8 Drawing Sheets

(56) References Cited

U.S. PATENT DOCUMENTS

| | | |
|---|---|---|
| 9,071,606 B2 | 6/2015 | Braun et al. |
| 9,537,994 B2 | 1/2017 | Baldasare et al. |
| 9,538,384 B2 | 1/2017 | Donnellan et al. |
| 9,557,889 B2 | 1/2017 | Raleigh et al. |
| 9,569,638 B2 | 2/2017 | Zatko et al. |
| 9,665,708 B2 | 5/2017 | Fanton et al. |
| 9,942,087 B2 | 4/2018 | Guntal et al. |
| 10,008,889 B2 | 6/2018 | Bell et al. |
| 2007/0220575 A1* | 9/2007 | Cooper ................ H04N 7/1675 725/118 |
| 2009/0181641 A1 | 7/2009 | Fiatal |
| 2011/0258467 A1 | 10/2011 | Antoci |
| 2013/0088192 A1 | 4/2013 | Eaton |
| 2014/0232635 A1 | 8/2014 | Lee et al. |
| 2014/0375261 A1 | 12/2014 | Manova-Elssibony et al. |
| 2015/0025935 A1* | 1/2015 | Hao ................... G06Q 30/0201 705/7.29 |
| 2016/0098770 A1 | 4/2016 | Chang et al. |
| 2016/0100312 A1 | 4/2016 | Bell et al. |
| 2017/0163645 A1* | 6/2017 | Bradley ................ G06F 16/951 |

* cited by examiner

APPARATUS, SYSTEM AND METHOD FOR DEVICE ACTIVATION

RELATED APPLICATIONS

This application is a divisional of, and claims priority under 35 U.S.C. § 120 to co-pending U.S. patent application Ser. No. 15/614,756, entitled "APPARATUS, SYSTEM AND METHOD FOR DEVICE ACTIVATION," filed Jun. 6, 2017, which claims the benefit under 35 U.S.C. § 119(e) to each of U.S. Provisional Application Ser. No. 62/346,083, entitled "APPARATUS, SYSTEM AND METHOD FOR CONTROLLING AND MONITORING DEVICE CHARGERS," filed on Jun. 6, 2016, U.S. Provisional Application Ser. No. 62/358,598 entitled "APPARATUS, SYSTEM AND METHOD FOR DEVICE ACTIVATION," filed on Jul. 6, 2016, and U.S. Provisional Application Ser. No. 62/439,419, entitled "PORTABLE POWER SOLUTIONS," filed on Dec. 27, 2016. The disclosure of each of the preceding applications is herein incorporated by reference in its entirety.

BACKGROUND OF INVENTION

1. Field of Invention

This invention relates generally to systems, apparatus and methods for distributing digital content. More specifically, at least one embodiment, relates to systems, apparatus and methods for engaging individuals with digital content in a process used to activate a device.

2. Discussion of Related Art

Opportunities for the distribution of advertising and other branded content have increased with the growth of the Internet and the widespread use of mobile devices. Cloud-based advertising is now ubiquitous. Further, the dynamic nature of digital content provides advertisers with a wide variety of interactive approaches with which to engage potential customers. In contrast to print advertising, the engagement can occur in response to real-time activity by the user/potential customer. In one example, music streaming services now offer users a choice to engage with advertising to receive a limited amount of time during which they can listen to music ad-free. Alternatively, the user can pay to receive ad-free music streaming.

Another common approach is employed at establishments that provide free Wi-Fi. Here, the service provider first delivers ad content to the user, for example, to their laptop, tablet or mobile phone. The user is able to access the free service following the display of the advertisement.

Brands also provide interactive displays to make goods available when a potential customer completes certain actions at the display. As one example, a sneaker company includes running shoes locked within a display located in a public space. The display unlocks a pair of sneakers for those individuals who run fast enough past the display.

The Internet of Things, hardware connected to the cloud (for example, to place items in communication with a user's mobile device) is rapidly becoming a part of everyday life. However, while the distribution of branded content is now used to gain access to digital content these approaches lack any practical interface with connected hardware.

SUMMARY OF INVENTION

Therefore, there is a need for systems, apparatus and methods that provide digital content providers with a dynamic approach to encourage individuals to receive the digital content on their wireless device in exchange for use of a device that provides a service. These approaches offer a direct contrast to an exchange of a digital content for more digital content. In various embodiments, the preceding results in active engagement by consumers with branded content, for example, advertising in exchange for something tangible.

Various systems, apparatus and methods described herein are employed to deliver content to an end-user at a point-of-purchase at a time when the end-user is making a purchasing decision. Further, the content can be customized based on location data and user-preferences known to the system.

Some embodiments described herein achieve the preceding by providing a controlled activation of the cloud-connected device. For example, the cloud-connected device may include an electrical/electronic switch that controls a connection of operational power to the cloud-connected device. As another example, a wider set of available features offered via a cloud connected device can be made available. According to some embodiments, an end user seeking to operate the device has an opportunity to either pay for the activation and use, or alternatively, receive and engage with branded content to activate and use the device without charge.

Given the widespread reach of the Internet of Things, such approaches can be employed in public establishments, for example, by patrons at bars and restaurants. These approaches can also be employed by students and personnel at universities. According to other embodiments, cloud-connected devices found in automobiles, homes, motels and hotels can be activated following the distribution and/or engagement of digital content to/by an end user. According to one embodiment, the cloud-connected device includes a portable charger employed by end users to charge handheld electronics in possession of the end user, for example, a mobile phone or tablet computer. In this embodiment, the end user first engages with branded content after which the output of the portable charger is switched on to allow the user to receive a one-time charge of her mobile device.

As used herein, "digital content" refers to any audio/visual media that can be delivered by a computing device. Thus, one of ordinary skill in the art will recognize in view of the disclosure provided herein that digital content can refer to still images, animated GIFs, text messages, videos or other content suitable for display, for example, display on a wireless device. One of ordinary skill in the art would also recognize that digital content can refer to music or other audio content. Further, digital content can include content originally provided in analog form which is processed for display or other reproduction on a digital device.

As used herein, "branded content" refers to digital content specifically relating to a particular brand or brands. One of ordinary skill in the art will recognize in view of the disclosure herein that digital content can relate to a brand by any of the following non-limiting examples: expressly identifying the brand in the digital content (visually or audibly), showing the brand's goods or services in use in the digital content, showing results and/or an impact provided by the brand's goods or services and showing trade dress, trademark(s) or other logos or information associated with the brand in the mind of consumers.

As used herein, "engagement" refers to an interaction between an end-user and a piece of digital content. One of ordinary skill in the art will recognize in view of the disclosure herein that engagement can include either a passive interaction between the end-user and the piece of digital content or an active interaction between the end-user and the piece of digital content. One of ordinary skill in the art will also recognize that an active interaction can require the end-user to physically interact with the digital content, visually interact with the digital content or to audibly interact with the digital content, a combination of the preceding or a combination of the preceding and a requirement to visually observe the digital content (a passive interaction). Further, one of ordinary skill in the art will also recognize in view of the disclosure herein that the preceding interactions are facilitated by the functionality of the inputs available in wireless devices, for examples, mobile phones, tablets and other computing devices.

According to one aspect, a method engages an individual with digital content to activate a device to deliver a service where the device is configured to operate in at least one state in which the device is configured to provide the service. According to some embodiments, the method includes wirelessly receiving, with the device operating in a first state that prevents a delivery of the service, a request from a requestor to activate the device to provide the service and offering the requestor an opportunity to place the device in a second state following her engagement with the digital content, where the device is configured to provide the service when in the second state. According to these embodiments, if the requestor chooses to engage with the digital content, digital content is wirelessly communicated for engagement by the requestor. Further, the state of the device is changed to the second state to allow the device to be used to provide the service following a completion of the engagement.

According to another aspect, a system for a delivery of digital content to a client device in possession of an individual includes: a source of digital content including a communication module configured to wirelessly communicate the digital content to the client device for engagement by the individual; a device that provides a service, the device having a plurality of operating states including a first state that prevents a delivery of the service by the device that provides the service and a second state that allows the delivery of the service by the device that provides the service; and a control element configured for inclusion in the device that provides the service and including a wireless receiver. According to some embodiments, the control element is responsive to a wireless signal indicating an engagement by the individual with the digital content received from the source of digital content on the client device. Further, the control element is configured to activate a change from the first state to the second state following a receipt of the wireless signal. If the individual chooses to engage with the digital content to receive the service, the operating element is signaled to activate the change from the first state to the second state following the engagement.

According to one embodiment, the system includes a software application configured to operate on the client device and the client device. Depending on the embodiment, the user interface includes any of a touch screen, a microphone, a graphical user interface, an inertial sensing system and a camera. Further, the software application is configured to detect the engagement based, at least in part, on an interaction with the client device, the interaction selected from a group consisting of a touch-input to the touch screen, a voice input received by the microphone, a cursor input received by the graphical user interface, a movement of the client device detected by the inertial sensing system and a gesture, image or facial recognition captured by the camera.

According to still another aspect, an apparatus is configured to include in a device that delivers a service. According to some embodiments, the apparatus is operable to activate the device to deliver the service following an interaction by a requestor with branded content delivered to a client device in possession of the requestor. According to one embodiment, the apparatus includes a processor; a wireless transceiver coupled to the processor and configured to communicate with the client device when the client device is in proximity with the apparatus; and at least one output element coupled to the processor. The at least one output element is configured to couple to the device and operable to activate the device. According to a further embodiment, the wireless transceiver is configured to communicate an identification code that uniquely identifies the apparatus where the identification code is employed in a selection of the branded content delivered to the client device. The wireless transceiver is configured to receive a signal indicative of a completion of the interaction by the requestor, and the processor is configured to change a state of the at least one output element to activate the device in response to the signal.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
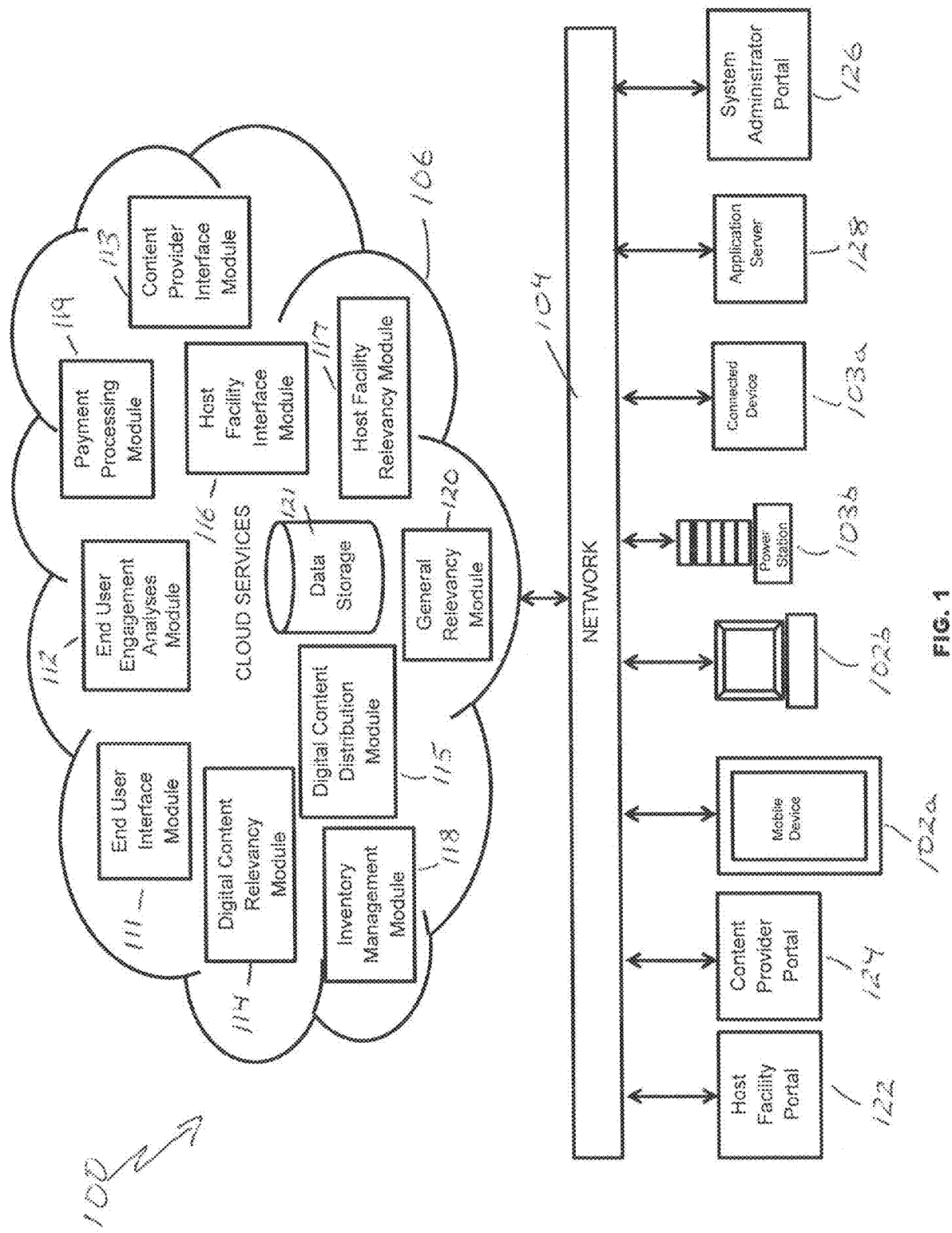
FIG. 1 illustrates a system including a network operating environment for a device in accordance with one embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and Referring to FIG. 1, a system 100 including a network operating environment for one or more client devices is illustrated in accordance with one embodiment. In the illustrated embodiment, the system 100 includes one or more client devices 102, one or more connected devices 103, a network 104 and services 106. According to the illustrated embodiment, the services 106 include an end user interface module 111, an end user engagement analyses module 112, a content provider interface module 113, a digital content relevancy module 114, a digital content distribution module 115, a host facility interface module 116, a host facility relevancy module 117, an inventory management module 118, a payment processing module 119 and a general relevancy module 120. The system 100 also includes a host facility portal 122, a content provider portal 124, a system administrator portal 126 and an application server 128 in the illustrated embodiment.

In general, the system 100 operates to allow individuals in possession of a client device 102 to activate one or more of the connected devices 103. According to various embodiments, the individual can choose to interact with digital content on the client device 102 in exchange for an activation of the connected device 103, or alternatively, opt to pay for the activation. As described in greater detail herein, the connected device 103 is employed to provide a service and/or goods once the device 103 is activated. For example, the connected device 103 may be activated for use following an interaction with branded content delivered to the client device 102.

The activation of the connected device 103 can include, for example, activation of a feature included in the device (for example, allowing the use of color printing in addition to the conventional black and white) or an activation of the full utility of the connected device 103 (for example, changing an operating state of the printer from "OFF" to "ON"). The connected device 103 can include any device configured to communicate with the services 106 and one or more client devices 102 which is also controllable via the services 106 and/or client devices 102 to change from an "inactive" state to an "active" state. The connected devices 103 may also be referred to as "a device that provides a service." As used in the preceding context, the term "service" can include either or both of providing a service (for example, color copying) or providing goods (for example, an item provided from a cloud-connected vending machine).

According to one embodiment, the branded content can include an image or a video. According to further embodiments, the interaction can include an input received by the client device 102 including any one of or any combination of a touch-input to a touch screen presented in the client device 102, a voice input received by a microphone included in the client device 102, a cursor input received by a graphical user interface rendered in the display of the client device 102, a movement of the client device 102 detected by an inertial sensing system included in the client device 102 and a gesture captured by a camera included in the client device 102.

In general, the network 104 can include either or both of local-area networks (LANs), wide area networks (WANs), wireless communication, wired communication and may include the Internet. According to a further embodiment, the network 104 provides access "over-the-cloud" to one or more remote devices, servers, application resource management and/or data storage systems. For example, the network 104 can allow communication between any of the client devices 102, the connected devices 103, with one another and/or with any of the other resources and devices coupled to the network 104. Communication can occur using any of Wi-Fi networks, Bluetooth communication, cellular networks, satellite communication, and peer-to-peer networks available either alone or in combination with one another via the network 104. Depending on the embodiment, the network 104 may be any type and/or form of network known to those of ordinary skill in the art capable of supporting the operations described herein. Thus, other communication protocols and topologies can also be implemented in accordance with various embodiments.

According to various embodiments, the client devices 102 can be, for example any of a portable device such as a tablet computer, a hand-held computer, a personal digital assistant, an e-reader, a mobile telephone, a camera, a smart phone, and enhance general packet radio service (EGPRS) mobile phone, a media player, a navigation device, an e-mail device, a game console, a laptop computer, or a combination of any two or more of these processing devices and/or other processing devices. As illustrated in FIG. 1, the client devices 102 include a mobile device 102*a* (for example, a mobile phone) and a stationary device 102*b* having limited or no mobility (for example, a desktop computer).

As is described in more detail with reference to FIG. 6, the client device 102 can include a general purpose processor (CPU), a graphics processing unit (GPU), a memory, a display (for example, a touchscreen) and additional processing devices, for example, a communication module. The client device 102 may have a plurality of input/output interfaces and devices such as a mouse, a joystick, a touchscreen, a keyboard, a camera, an inertial sensing system, a microphone, etc. Further, the client device 102 may include any one or any combination of peripheral devices, for example, a positioning system, an RF transceiver, a motion sensor, a light sensor, a proximity sensor, one or more additional sensors, communications hardware and an audio including the speaker and/or annunciators. In various embodiments, any of the preceding peripheral devices, alone or in combination with other peripheral devices or other devices generally, can be employed as an input/output interface.

According to some embodiments, the client devices 102 can display one or more graphical user interfaces to provide the user access to various system objects (for example, a display object) and for conveying information to the user. A non-exhaustive list of examples of such system objects include device functions for tools used to: establish a user account; interact with digital content; communicate with the services 106; communicate with the connected devices 103; communicate with other client devices 102; and presentation of alerts, events or other visual references graphically represented. Accordingly, one or a plurality of icons can be rendered for viewing and/or selection in the display via either a touch input, or other input such as a cursor rendered in the display, a voice input or a motion input sensed by the client device 102.

According to some embodiments, the tools are provided in a digital content distribution and device activation application that the user downloads to the client device 102. For example, the application can be downloaded from the application server 128, for example, a system administrator. According to some embodiments, the application server 128 is hosted by a third party service, for example, in an application store or other digital application distribution platform from which other applications unrelated to the digital content distribution/device activation application can also be accessed and downloaded (well-known current examples include the iOS App Store operated by Apple, the Amazon App store and Google Play). In one embodiment, the application includes a web-application to allow content distribution and device activation using any device with a web browser. According to this embodiment, the application server 128 allows distribution of an application that does not include a native application built for a specific operating system. Thus, the application can be employed across a much wider range of devices.

According to further embodiments the application server 128 is provided by the entity that hosts the services and resources included in the services 106. Accordingly, in some embodiments the application server 128 is integrated into the services 106. In further embodiments, the system 100 allows updates to the device-activation application and other software to be "pushed" to any of the client devices 102 from either or both of the application server 128 and the services 106.

There is a wide variety of device-types that can be included in the connected devices 103. The connected device 103a is representative of connected devices generally while the connected device 103b provides one particular example. The connected device 103b illustrates a power charging system including a base station (also referred to as a "powerstation") and individual portable chargers. As explained in greater detail herein, the portable chargers include a power source used to charge client devices 102 following an activation of the portable charger via engagement with digital content or a receipt of payment. The portable chargers are returned to the base station following their use for storage and recharging.

Other forms of connected devices 103 can include any device which provides a service, task, operation, feature or function and can be controlled to place the device 103 in an active state and in an inactive state. In the active state the device operates to provide the service, task, operation, feature or function (such as providing goods). In the inactive state the device is prevented from providing the service, task, operation, feature or function. A non-limiting and non-exhaustive list of connected devices includes vending machines, photo copiers, HVAC systems, beverage taps, lighting systems, appliances (including home appliances) and automobiles.

Depending on the embodiment, the system 100 can provide access to one or more resources included in the services 106 to each of a system administrator, a host facility and a provider of digital content. The system administrator is the entity responsible for operation and provisioning of the services 106. Host facilities are the facilities at which connected devices 103 are located. These can include but are not limited to public establishments (including retail establishments such as shops, salons, bars and restaurants), universities, schools, other non-profits, private offices and homes, rental facilities, hotels and motels. According to some embodiments, host facilities can include either a single location or multiple geographically distinct locations. Content providers are the entities that provide digital content, for example, advertising and other branded digital content for distribution in the system 100.

According to the illustrated embodiment, each of the host facility portal 122, the content provider portal 124 and the system administrator portal 126 can be provided by an application running on a processing device such as a desktop computer or a portable electronic device. The system administrator portal 126 provides the administrator with access to maintain the system 100 and services 106 in an operational state, add host facilities and content providers, review digital content provided by the content providers, review performance at host facilities, add and revise analytical tools (for example, the relevancy modules 114 and 117) employed by any of the system administrator, the content providers and the host facility, add users and manage user accounts/status.

The content provider portal 124 provides content providers (for example brands, brand managers and their agents) to establish an account and access to upload, remove and otherwise manage content included in the services 106 for distribution via the system 100. According to some embodiments, the content provider portal 124 also allows content providers an ability to manage content distribution algorithms, for example, algorithms employed to ensure relevant content is delivered to end users. For example, the content provider portal 124 can allow a content provider to upload digital content such as videos, still images, audio files and surveys.

The host facility portal 122 provides host facilities access to establish and manage an account, to request and pay for services and to manage preferences. For example, the host facility portal 122 can allow a host facility to identify the quantity and types of connected devices at the host facility, to sign up for selected services, to review data concerning the usage of connected devices and end user actions including choices and responses to digital content distributed at the facility.

In general, the content provider can include any entity interested in distributing digital content to an audience(s) typically found at one or more host facilities. Thus, the content can include anything including digital content that is considered purely promotional material (e.g., an advertising image), digital content that includes content that is considered purely entertainment material (e.g., a popular new song), digital content that includes content that is considered purely editorial (e.g., a political statement) and combinations of the preceding alone or in combination with other types of digital content.

In general, the approaches illustrated and described herein can be employed to distribute digital content at the time and place at which the messaging included in the content is most effective. For example, branded digital content can be delivered at a point-of-purchase to activate a device for a user who has an immediate buying decision in which goods or services including the brand represented in the digital content are available for purchase.

The term "user" as used to describe one or more modules included in the services 106 refers to a user of the services 106. As will be apparent to those of ordinary skill in the art in view of the disclosure provided herein, the "user" of the services 106 may differ from the "user" of the connected device 103 when the services are provided. For example, a first individual having an account to receive the services 106 may be the person who receives and interacts with the digital content to allow another individual to receive the services provided by the connected device 103.

Referring to the services 106 illustrated in FIG. 1, the end user interface module 111 is employed by individuals in possession of the client devices 102 to establish their account with the services 106, input payment data and use the services 106. For example, the end user interface module 111 receives the individuals' selections on how they wish to activate the connected device 103 via direct payment or via engagement with digital content including an interaction. User contact information can be collected using the end user interface module 111. This also allows the end user interface module 111 to be employed in communicating with the individuals as needed (for example, communication by a system administrator). According to one embodiment, an individual can establish an account via reference to an application/account provided by a third-party. For example, a user may establish an account by using an account established on Facebook, Twitter, or other third-party authentication providers.

In various embodiments, the data received by the end user interface module 111 is stored and persists with new data collected from each activation experience. According to a further embodiment, the end user interface module 111 also allows individuals to set their preferences to filter digital content. As explained in greater detail below, the preference information can be employed to refine the distribution of digital content to deliver relevant, impactful and appreciated experiences to users. The preceding results in increased awareness and goodwill associated with brands represented in the digital content.

According to one embodiment, the end user engagement analyses module 112 processes and stores the choices, connections, and preferences of the users based on preferences entered into the end user interface module 111, the general relevancy module 120, as well as a record of the host facilities the user frequents, the behaviors exhibited by the user at different host facilities and with different digital content. As one example, a user may always pay to activate their charger when at a restaurant. However, the user always chooses to engage with the digital content when at the gym, the salon and the dentist's office. The end user engagement module 112 is employed to detect and save these patterns of behavior. As another example, a pattern of behavior may demonstrate that a user doesn't like beer. That knowledge can be employed by the services 106 to alter the digital content distribution to better engage the user by switching content categories, for example, by including a liquor advertisement in the digital content rather than an advertisement for beer.

In one embodiment, the content provider interface module 113 allows content providers to upload digital content for distribution to users via the system 100. According to this embodiment, the system administrator screens content for approval prior to releasing the content for distribution. The content provider interface module 113 also allows content providers to select or target specific audiences given the data in the digital content relevancy module 114 to better achieve objectives such as reach, awareness, social shares, site visits, downloads, activity when in host facilities, purchases, etc. Contact and payment information for the content provider can also be collected via the content provider interface module 113 according to one embodiment.

According to one embodiment, the digital content relevancy module 114 allows content providers to distribute targeted digital content to users via the system 100. According to some embodiments, the targeting is based on performance metrics recorded by the system 100, for example, user interaction and preferences concerning the content when distributed in advance of the activation of the connected device 103. Therefore, the content can be distributed with improved relevancy over time as user responses and interactions associated with the content are recorded by the system 100. Further, the digital content relevancy module 114 can employ information collected and stored via the general relevancy module 120, the end user engagement analyses module 112, the end user interface module 111, the host facility relevancy module 117 and the host facility interface module 116.

According to one embodiment, the digital content distribution module 115 is employed by the system to distribute digital content stored "in the cloud" to be delivered to users for engagement by users in exchange for a free activation of a connected device 103. For example, a content provider that owns a premium-coffee brand provides content concerning their brand for distribution to end users who have an affinity for premium coffee in exchange for activation of a power charger available at a coffee shop.

According to one embodiment, the host facility interface module 116 is employed by host facilities to provide contact information as well as set preferences for connected devices located on their premises. Preferences can include whether the host facility would like to sponsor device activations in which case the host facility interface module 116 is employed for receipt of payment information, the host's own digital content, etc. Preferences can also include whether the host facility would like to allow third-party digital content distributed to users who are at the host's facility. If the host facility elects to allow distribution of third-party digital content, host facilities can use the host facility interface module 116 to select content categories to calibrate and filter the types of content distributed at their establishment.

For example, the host facility interface module 116 can also allow the host facility access to view the usage of the products/service at their location. For example, a gym that hosts one or more power-charging connected devices may have a strong organic goods policy and brand purpose. If the host-gym is not interested in spending money to either advertise themselves or to sponsor charges, they can utilize the host facility interface module 116 to restrict content to only organic materials/products. In this example, the result allows the host facility a level of control over the content to ensure it is in keeping with their values. End users (and gym customers) are happy because they believe in the organic culture and discover new, organic products that can help them on their fitness journeys. The content providers are happy because this filter gives them the opportunity to directly reach relevant audiences at opportune moments. The preceding can be a particularly effective tool for products that are directed at niche markets.

According to one embodiment, the host facility relevancy module 117 allows data and analyses to be entered into the system to create a profile of the venue. The data can include the demographics of typical users (customers or other individuals who frequent a particular venue) and their typical schedules (the time of day and/or day(s) of the week that the users are typically present). Here too, the accuracy of the relevancy data can improve over time as more information is gathered regarding the profiles and preferences of the users attending these host facilities. As one example, a salon, located in a high end shopping district may be known for excelling in high-end blonde highlights. As a result of the location, pricing and services, the salon attracts mainly upper class women who spend significant amounts of money during daytime hours. This demographic information can be employed, for example, by the content distribution module 115 to increase the relevancy of the content distributed to these users.

According to a further embodiment, the host facility relevancy module 117 can be employed by the system administrator to ensure that the host facility accurately represents and categorizes themselves. An accurate representation can help ensure that relevant digital content is distributed to users when at the host facility. This result can benefit users and content providers as well as the brand image of the system administrator where an identity of the system administrator is known to end users.

According to one embodiment, the inventory management module 118 allows the company to monitor the usage and health of the connected devices 103 to replace and renew supplies as needed. This data is valuable to ensure positive end user and digital content provider experiences at the host facilities. For example, the host facility or system administrator can initiate a replacement of a connected device 103 at the host facility based on status information provided by the inventory management module, concerning the device. Depending on the embodiment, status information can include any one of or any combination of the following and/or other facts: a log of total hours used since the connected device was placed at the host facility; a log of a total quantity of activations of the connected device for a given time period or since installation at the host facility and information concerning a performance of the connected device. For example, where the connected devices includes power chargers and a usage report shows that several of the chargers are nearing an end of their life cycle the chargers are replaced or placed off-line. The preceding assists in maintaining a positive user experience by ensuring that users (for example, customers at the host facility) find functional chargers at the facility.

In one embodiment, the payment processing module 119 allows the user a choice to pay for the service rather than engaging with digital content. The payment processing module 119 also allows the company to collect collateral payment if a connected device 103 goes missing when it was last in the hands of that user. According to a further embodiment, the system administrator detects the status of the missing connected device using information provided by the inventory management module 118. For example, a user may forget to return a power-charging connected device after use. In this case, the system administrator, via the inventory management module 118 is aware that the charger left the host facility. Consequently, the user can be sent a reminder, via the end user interface module 111, to return the power-charging connected device before the first late fee is charged.

According to one embodiment, the general relevancy module 120 is employed to collect and save information concerning the broader universe (i.e., beyond just the information provided by the system such as profiles and preferences). This information can show current trends, macro-patterns, and provide a control for other data. According to a further embodiment, the information is obtained in real time from, for example, on-line news sources and social media networks. For example, an otherwise unexplainable significant dip on the usage reports concerning device activations can be explained by a blizzard that occurred during that period. The general relevancy module can also assist content providers concerning the nature and/or type of content to share based on facts concerning these external factors. For example, the general relevancy module 120 can also pull trends concerning buying decisions. According to this embodiment, if color trends show that consumers are trending toward choosing humble colors when making large purchases the content provider can choose to display a brown car instead of a red car in the digital content provided to users. In a further example, the general relevancy module 120 can also be employed to explain, and predict, surges in use of connected devices 103 based on publicly available information. According to this embodiment, the general relevancy module 120 can predict a surge in the use of power-charger connected devices 103 at bar host facilities during St. Patrick's day weekend.

According to the illustrated embodiment, the services 106 include data storage 121. In one embodiment, the data storage 121 can be centralized for all the modules included in the services 106. In another embodiment, at least some of the data storage is included in one or more of the modules. For example, modules such as the end user interface module 111, general relevancy module 120 and digital content distribution module 115 include data storage according to one embodiment. According to still another embodiment, the data storage is fully distributed among one or more of the modules included in the services 106.

According to some embodiments, the data storage includes one or more databases. The databases can store user identification information (for example, user IDs and passwords), payment information, digital content, other information associated with the user such as their social network/contacts and/or other preferences, and information concerning digital content providers and host-facilities. Depending on the embodiment, the databases can include any of a relational database, object-oriented database, unstructured database, or other database. Further, the databases can be included in any aspect of a memory system, such as in RAM, ROM or disc, and may also be separately stored on one or more dedicated data servers included in the services 106.

As should be apparent to one of ordinary skill in the art in view of the disclosure provided herein, the services 106 can include other services and/or resources and combinations of services and/or resources different than those described above depending upon the embodiment. As one example, functionality provided by the end user interface module 111 and the end user engagement analyses module 112 can be provided in a single "end user focused" module included in the services 106. As another example, functionality provided by the host facility relevancy module 117 and the host facility interface module 116 can be included in a single "host facility focused" module included in the services 106.

It will also be apparent to those of ordinary skill in the art in view of the disclosure provided herein that elements of the services 106 can communicate with one another to share information. For example, collected relevancy data can be used by content distribution modules.

Figure 2:
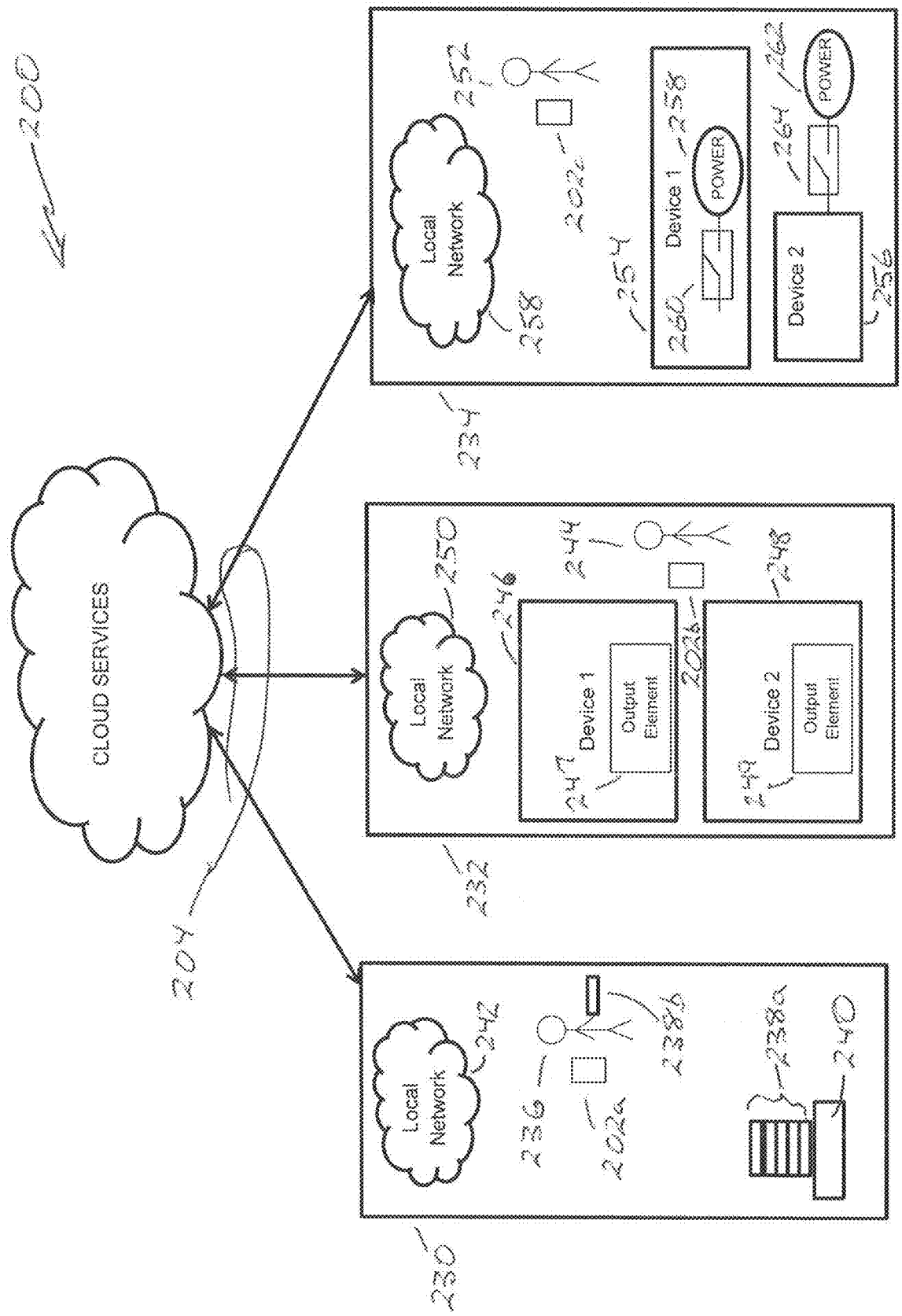
FIG. 2 illustrates a block diagram of a system including devices that can be activated in accordance with one embodiment.

Referring now to FIG. 2, a block diagram of a system 200 for digital content distribution and device activation is illustrated in accordance with one embodiment. In the illustrated embodiment, the system 200 includes a network 204, cloud services 206, a first host facility 230, a second host facility 232 and a third host facility 234. The host facilities 230, 232, 234 are connected to the cloud services 206 by the communication network 204. The communication network 204 may be of the sort illustrated and described with reference to FIG. 1 and the network 104. Further, the services 206 may be of the sort illustrated and described with reference to FIG. 1 and the services 106, including any or all of the modules illustrated and described concerning the services 106.

Depending on the embodiment, the local network 242 can include any of local-area networks (LANs), wide area networks (WANs), wireless communication, wired communication and may include the Internet. According to further embodiments, the local network 242 provides access to one or more remote devices, servers, application resource management and/or data storage systems either alone or in combination with the network 204. Communication can occur using any of Wi-Fi networks, Bluetooth communication, cellular networks, satellite communication, and peer-to-peer networks. The local networks 242 can be any network topology as known to those of ordinary skill in the art capable of supporting the operations described herein. Thus, other communication protocols and topologies can also be implemented as a part of the local network 242 in accordance with various embodiments.

FIG. 2 illustrates a limited quantity of host facilities, connected devices and users. However, the approaches described herein are scalable such that each host facility 230, 232, 234 can include a plurality of connected devices for use by a plurality of individuals. Further, there are no limits to the number of host facilities that can be included in the system 200.

According to the illustrated embodiment, the first host facility 230 includes a first user 236, a plurality of connected devices 238, a base station 240 and a local network 242. The user 236 is in possession of a client device 202a. The client device 202a may be of the sort illustrated and described with reference to FIG. 1 and the client device 102. In one embodiment, the first host facility includes the plurality of connected devices 238a are portable chargers employed to charge the client device 202a or other electronic device that operates on battery power in use. For example, the electronic device that the user 236 wishes to charge can be a tablet computer, a hand-held computer, a personal digital assistant, an e-reader, a mobile phone, a camera, a smart phone, and enhance general packet radio service (EGPRS) mobile phone, a media player, a navigation device, an e-mail device, a game console, or a laptop computer. Further, the device to be charged may be a device in possession of the user 236 or a device in possession of a third party (for example, a friend) that the user 236 would like to assist by activating one of the plurality of connected devices 238a.

In general, the device activation occurs when the user 236 selects one of the plurality of connected devices 238b, requests an activation of the connected device 238b and either engages with digital content delivered to the client 202a or alternatively agrees to pay for the charge. Once activated, the charger is employed to charge the portable electronics. When the charge is complete, the charger is returned to the base station 240.

According to one embodiment, the base station is employed to store the connected devices 238, to monitor a status of each of the connected devices 238 and to charge the connected devices 238. As is explained in more detail with reference to FIG. 5, each of the base station 240 and the connected devices 238 may include a wireless transceiver for communication with one another, with any of the services 206 and with the client device 202a depending on the embodiment. The communication can occur between any two of the client device 202a, the connected devices 238, the base station 240 and the services 206. Depending on the embodiment, communication can occur directly between the preceding elements via the local network 242, via the network 204, directly on a peer-to-peer basis or a combination of any of the preceding.

According to the illustrated embodiment, the second host facility 232 includes a second user 244, a first connected device 246, a second connected device 248 and a local network 250. The second user 236 is in possession of a client device 202b. The first connected device 246 includes a first output element 247 and the second connected device includes a second output element 249. The client device 202b may be of the sort illustrated and described with reference to FIG. 1 and the client device 102. The local network 250 may be of the sort illustrated and described with reference to the first host facility 230 and the local network 242.

According to the illustrated embodiment, the second user 244 can activate either of the connected devices 246, 248 when the second user either engages with digital content delivered to the client 202b or alternatively agrees to pay for the device activation. In each case, the output element 247, 249 is employed to activate the connected device 246, 248, respectively. Activation results in the connected device 247, 249 being placed in a state in which the connected device can provide a service sought by the second user 244. According to one embodiment, the service includes at least one feature included in a plurality of features included in the connected device 246, 248. For example, the at least one feature can include service upgrades available from the connected device 246, 248 that provides the service. Further, in various embodiments, the services can include color copying services, free receipt of an item being sold at a point-of-purchase, receipt of a more expensive item at no additional cost at the point-of-purchase and environmental controls including any of an activation of color lighting and a custom control of a temperature setting of an HVAC system.

Depending on the embodiment, the output element 247, 249 can include any of a digital output or an analog output. According to one embodiment, the output element 247, 249 includes a digital switch, for example, implemented using transistor-transistor logic. Other digital circuit elements can be employed depending on the embodiment. According to another embodiment, the output element 247, 249 includes an analog electrical contact. According to one embodiment, the output element 247, 249 is provided in specially-programmed, special purpose hardware, for example, an application-specific integrated circuit (ASIC). According to still another embodiment, the output element 247, 249 is implemented solely in software included in the connected device 246, 248.

In various embodiments, the output element can include any of a wireless transceiver, a processor and memory. For example, the wireless transceiver can provide for communication between the output element 247, 249, respectively, the client device 202b, and the services 206. Depending on the embodiment, communication can occur directly between the preceding elements via the local network 242, via the network 204, directly on a peer-to-peer basis or a combination any of the preceding.

Further, the output element 247, 249 can be provided as a packaged unit configured to add to a device that provides a service such that an operating state of the device that provides the service can be controlled via interaction with the client device 202b. For example, the device that provides the service can be maintained in an inactive state, maintained in an active state or switched between an active state and an inactive state. Thus, in one embodiment, the output element 247, 249 is included in the connected device 246, 248, respectively, at the time of manufacture. According to another embodiment, the output element 247, 249 is retrofitted to an existing device that provides a service to enable operation as a connected device 246, 248, respectively.

According to the illustrated embodiment, the third host facility 234 includes a third user 252, a first connected device 254, a second connected device 256 and a local network 258. The third user 252 is in possession of a client device 202c. The client device 202c may be of the sort illustrated and described with reference to FIG. 1 and the client device 102. The local network 258 may be of the sort illustrated and described with reference to the first host facility 230 and the local network 242. The first connected device 254 includes a power source 258 and an output element 260. The second connected device 256 is connected to a power source 262 via an output element 264. In each instance, the output element 260, 264 is located in a power circuit that supplies power to the first connected device 254 and the second connected device 256, respectively.

According to the illustrated embodiment, the third user 252 can activate either of the connected devices 254, 256 when the third user either engages with digital content delivered to the client 202c or alternatively agrees to pay for the device activation. In each case, the output element 260, 264 is employed to activate the connected device 254, 256, respectively, by turning the power circuit on. Once turned on, the connected device 254, 256 is operational to provide a service.

According to one embodiment, the output devices 260, 264 include a conventional analog switch, for example, a relay with contacts that are located in series in the power circuit. According to another embodiment, the output devices 260, 264 include a solid state switch.

For the first connected device 254, each of the power source 258 and the output element 260 are located integral to the first connected device 254. According to this embodiment, the power source 258 can include either or both of a battery power source or an external source of power that is supplied to the first connected device 254. According to one embodiment, the output element 260 can be packaged with any of a wireless transceiver, a processor and memory. In a further embodiment, the output element 260 is included in the form of a single device (a "black box") that can communicate with any of the client device 202c and the services 206. Depending on the embodiment, communication can occur directly between the preceding elements via the local network 258, via the network 204, directly on a peer-to-peer basis or a combination any of the preceding.

For the second connected device 256, each of the power source 262 and the output device 264 are located external to the device 256. For example, the output element can be packaged with any of a wireless transceiver, a processor and memory. Further, the output element 264 can be provided as a packaged unit configured to retrofit such that the system 200 can control the on/off status of the second connected device 256.

Figure 3:
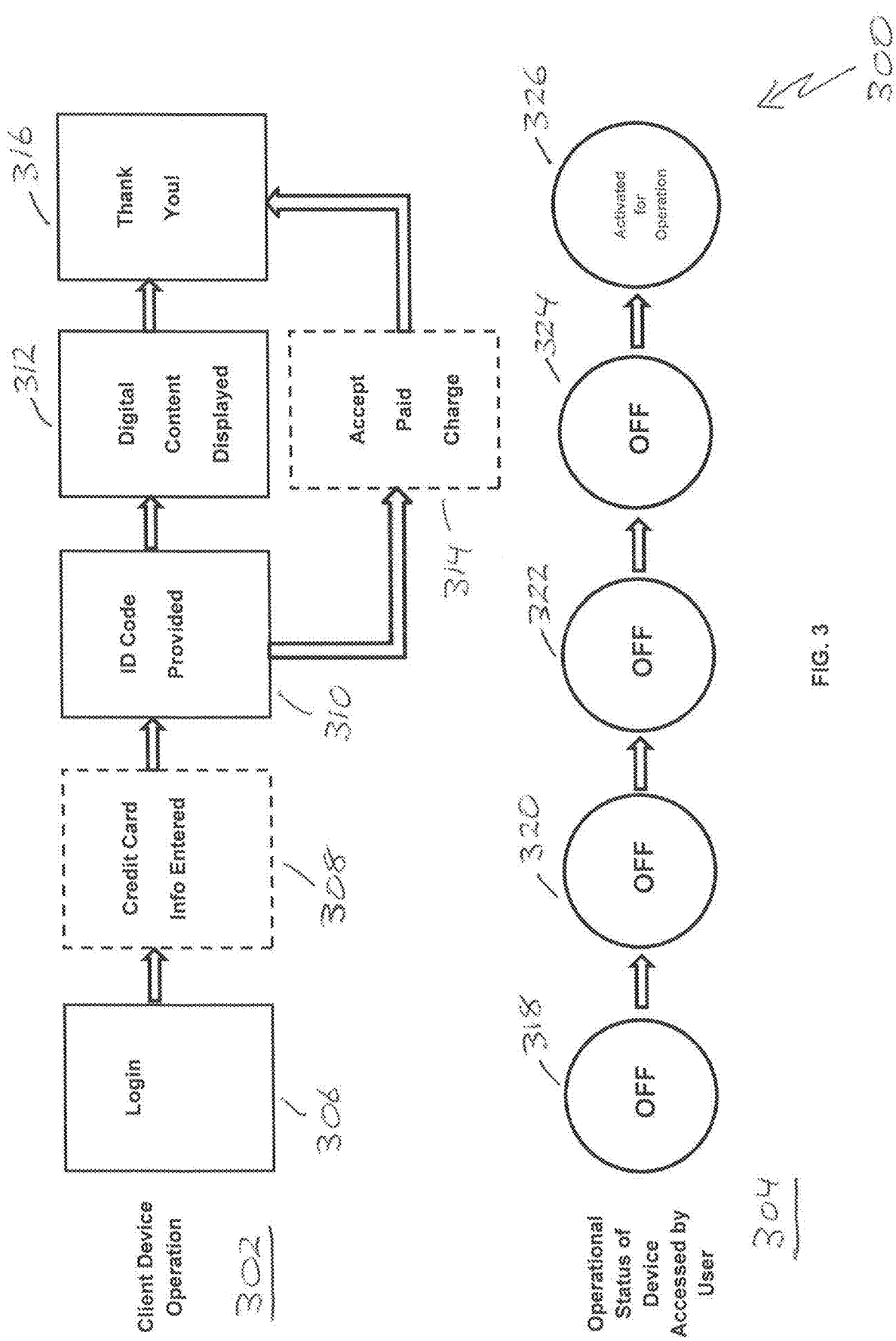
FIG. 3 illustrates a process employed to activate a device in accordance with one embodiment.

Referring now to FIG. 3, a block diagram of a process 300 employed to activate a device is illustrated in accordance with one embodiment. The block diagram includes a process flow to illustrate a series of screens 302 rendered in a client device (for example, client devices 102, 202) as a user moves through acts to activate a connected device. The process 300 also includes a flow diagram 304 of an operational status of the connected device (for example, connected devices 103, 238, 246, 248, 254, 256).

In the illustrated embodiment, the series of screens includes a login screen 306, a payment information entry screen 308, an ID code provided screen 310, a digital content displayed screen 312, a payment acceptance screen 314 and an acknowledgement screen 316. According to various embodiments, one or more screens may be omitted, added or reordered in the series of screens 302. For example, each of the payment information entry screen 308 and the payment acceptance screen 314 are illustrated in phantom in FIG. 3 because they are optional, or not employed, in some embodiments.

The flow diagram 304 of the operational status includes a first status 318, a second status 320, a third status 322, a fourth status 324 and a fifth status 326. According to the illustrated embodiment, the first status 318 corresponds to the operational status of the connected device at the time the login screen 306 is displayed, the second status 320 corresponds to the operational status of the connected device at the time the payment information entry screen 308 is displayed, the third status 322 corresponds to the operational status of the connected device at the time the ID code provided screen 310 is displayed, the fourth status 324 corresponds to the operational status of the connected device at the time the digital content displayed screen 312 is displayed (or alternatively, at the time the payment acceptance screen 314 is displayed) and the fifth status 326 corresponds to the operational status of the connected device at the time the acknowledgement screen 316 is displayed. In the illustrated embodiment, the operational status of the connected device is OFF in each of the first status 318, the second status 320, the third status 322, the fourth status 324 and ACTIVATED FOR OPERATION in the fifth status 326. According to various embodiments, the operational status may differ from that illustrated in FIG. 3, for example, the operational status may be ACTIVATED FOR OPERATION in the fourth status 324.

In operation, an individual requesting activation of a device to provide a service (for example, connected devices 103, 238, 246, 248, 254, 256) employs their client device (for example, client devices 102, 202) to access an application employed to request activation of the device to provide the service. In one embodiment, the process begins with the user logging-in to the application at the login screen 306. For example, login can include entry of any of a user name, an alternate user identification, a password, a passcode or a combination of the preceding as some examples. Additional or different information can be required for registration of a first time user.

In one embodiment, while the operational status of the device to provide the service remains off, the process continues at the payment information entry screen 308. Depending on the embodiment, the payment information entry screen 308 can require entry of account information for a user-selected form of payment (credit card, PayPal, digital currency, etc). Alternatively, a previously registered user may be asked to authorize charges, if any, to an account that is already associated with their device-activation user account. Depending on the embodiment, the payment information entry screen 308 is displayed even where the user plans to engage with digital content to activate the device to provide the service. The preceding may be required as "collateral" against loss, damage or theft of the device to provide the service (for example, connected devices 103, 238, 246, 248, 254, 256). According to other embodiments, presentation of the payment information entry screen 308 is not included in the process 300. For example, a previously registered user with valid payment information may login using the login screen 306. In this example, the pre-authorization makes the display of the payment information entry screen 308 unnecessary. As another example, a company or other entity may host an event at which they assume the risk for loss or damage of connected devices. In these embodiments, the process moves directly to a display of digital content and device activation.

With successful receipt and/or authorization of the payment information, the process 300 on the client device 102, 202 moves to the ID code provided screen 310. Here, an identification code that uniquely identifies a specific connected device is accessed by and/or provided by the user via the application operating on the client device 102, 202. In one embodiment, the ID code is communicated from the connected device 103, 238, 246, 248, 254, 256 to the services 106, 206 as a part of the activation process. Depending on the embodiment, the ID code can be communicated from the connected device 102, 103 to the services 106, 206 directly, via the communication network 104, 204, or the local network 242, 250, 258 either alone or in combination. Alternatively or in addition to the preceding, the ID code can be communicated from the connected device 102, 103 to the services 106, 206 via the base station 240 in combination with at least one of the communication network 104, 204 and the local network 242. As a further alternative, the ID code can be communicated from the connected device 102, 103 to the services 106, 206 via the client device 102, 202 in combination with at least one of the communication network 104, 204 and the local network 242, 250, 258. According to another embodiment, the ID code is visible at the connected device 103, 238, 246, 248, 254, 256, for example, on a label or in a display included with the connected device. In this embodiment, the user employs the client device 102, 202 to enter the ID code and provide the code to the services 106, 206 using the application. According to some embodiments, the ID code provided screen 310 is presented in advance of the payment information entry screen 308.

In some embodiments, the process 300 includes a prompt provided to the user via the client device 102, 202 to determine whether the user would like to pay for activation of the device or engage with digital content to receive a no-cost activation. According to other embodiments, a pay option is not included. In embodiments where, the user accepts receipt of digital content, the process 300 moves to the digital content displayed screen 312. The user then engages with the digital content on the client device 102, 202.

Where the user opts to pay for the device activation, the process includes display of the payment acceptance screen 314. Alternatively, a screen indicating the rejection of the payment information is provided to the user. The user can then provide a different form of payment or correct the information that was originally provided.

Throughout the portion of the process corresponding to the display of the screens 306 through 312 and 314, the connected device 103, 238, 246, 248, 254, 256 is in an inactive operational state. However, when the user engages with the digital content the connected device is activated. As a result, the process 300 moves forward such that the series of screens displays the acknowledgement screen 316, for example, a screen that thanks the user for engaging with the digital content to activate the device. Thus, the operational status of the connected device 103, 238, 246, 248, 254, 256 moves to the fifth status 326 at which the device is ACTIVATED FOR OPERATION.

Similarly, the process 300 moves forward such that the series of screens displays the acknowledgement screen 316 following the acceptance/approval of the payment information (see payment acceptance screen 314) where the user opts to pay for the device activation. As a result, the operational status of the connected device 103, 238, 246, 248, 254, 256 moves to the fifth status 326 at which the device is ACTIVATED FOR OPERATION.

As a result of an activation of a connected device, the connected device may change from a completely inoperative state to an operative state, for example, from OFF to ON. Alternatively, the act of activating may change the connected device from a first operative state to a second operative state. For example, a change to ACTIVATED FOR OPERATION can turn on additional features otherwise unavailable. Thus, the second operative state can include at least one additional feature and/or service that is unavailable in the first operative state. For example, the services made available in the second operative state can include color copying services, free receipt of an item being sold at a point-of-purchase, receipt of a more expensive item at no additional cost at the point-of-purchase and environmental controls including any of an activation of color lighting and a custom control of a temperature setting of an HVAC system.

Figure 4:
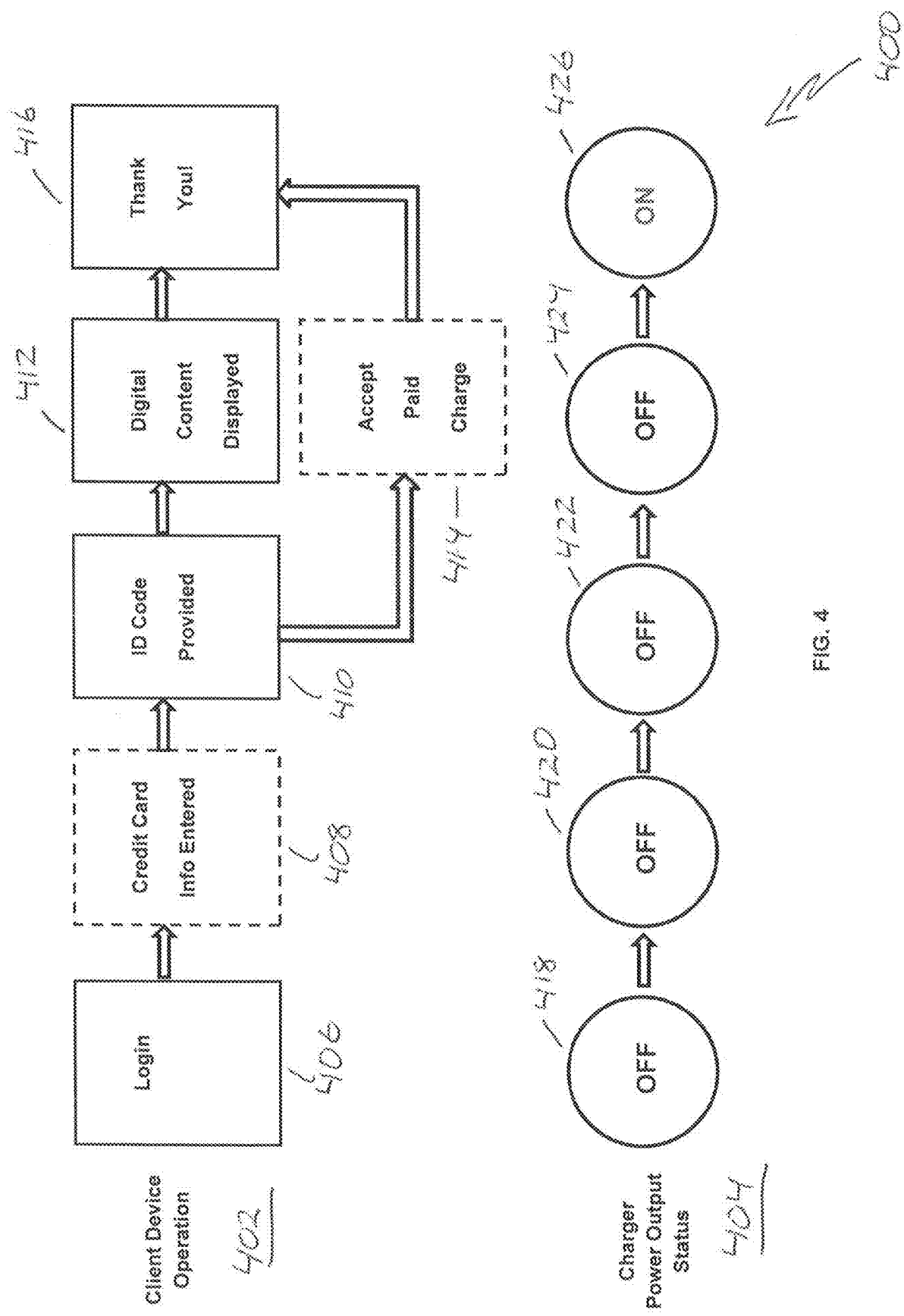
FIG. 4 illustrates a process employed to activate a charging device in accordance with one embodiment.

Referring now to FIG. 4, a block diagram of a process 400 employed to activate a device is illustrated in accordance with one embodiment. In particular, these embodiments concern a device in which an operating element is employed to change a state of the connected device from OFF to ON when the connected device is activated. In one embodiment, the connected device includes a power charger.

The block diagram includes a process flow to illustrate a series of screens 402 rendered in a client device (for example, client devices 102, 202) as a user moves through acts to turn on a connected device. The process 400 also includes a flow diagram 404 of an operational status of the connected device (for example, connected devices 103, 238, 246, 248, 254, 256).

In the illustrated embodiment, the series of screens includes a login screen 406, a payment information entry screen 408, an ID code provided screen 410, a digital content displayed screen 412, a payment acceptance screen 414 and an acknowledgement screen 416. According to various embodiments, one or more screens may be omitted, added or reordered in the series of screens 402. For example, each of the payment information entry screen 408 and the payment acceptance screen 414 are illustrated in phantom in FIG. 4 because they are optional, or not employed, in some embodiments.

The flow diagram 404 of the operational status includes a first status 418, a second status 420, a third status 422, a fourth status 424 and a fifth status 426. According to the illustrated embodiment, the first status 418 corresponds to the operational status of the connected device at the time the login screen 406 is displayed, the second status 420 corresponds to the operational status of the connected device at the time the payment information entry screen 408 is displayed, the third status 422 corresponds to the operational status of the connected device at the time the ID code provided screen 410 is displayed, the fourth status 424 corresponds to the operational status of the connected device at the time the digital content displayed screen 412 is displayed (or alternatively, at the time the payment acceptance screen 414 is displayed) and the fifth status 426 corresponds to the operational status of the connected device at the time the acknowledgement screen 416 is displayed. In the illustrated embodiment, the operational status of the connected device is OFF in each of the first status 418, the second status 420, the third status 422, the fourth status 424 and ON in the fifth status 426. According to various embodiments, the operational status may differ from that illustrated in FIG. 3, for example, the operational status may be ON in the fourth status 424.

The process 400 moves forward through the series of screens 402 in the same manner as described concerning the process 300 and the series of screens 302 illustrated and described with reference to FIG. 3. Similarly, the operational status of the connected device remains OFF until either the user engages with digital content or provides authorized payment information. The operational status changes to ON at the fifth status 426 when the connected device is powered-up for operation.

Figure 5:
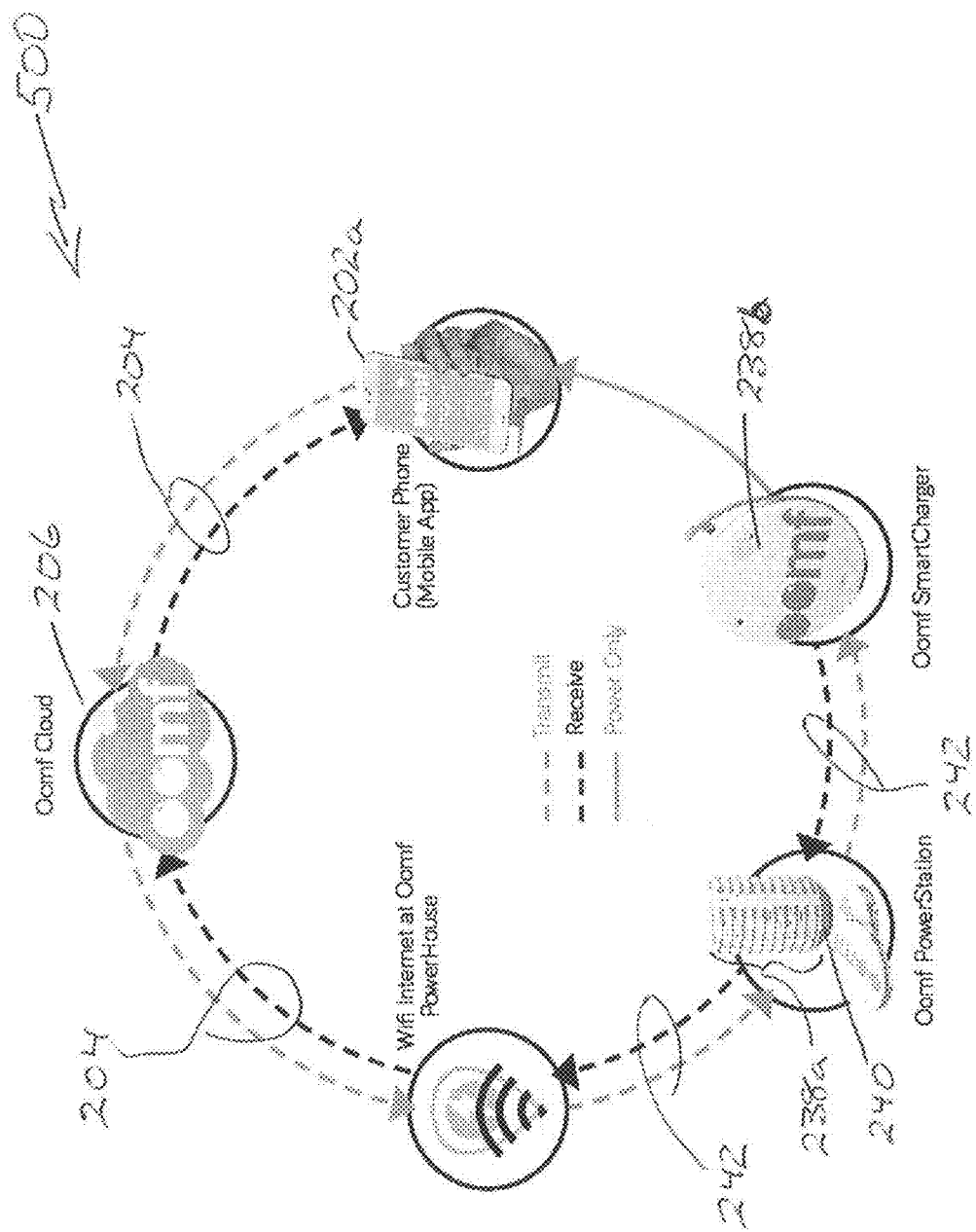
FIG. 5 illustrates a flow diagram of the process illustrated in FIG. 4 in accordance with a further embodiment.

Referring to FIG. 5, a flow diagram of a process 500 is illustrated in accordance with a further embodiment. Referring to the first host facility 230 illustrated in FIG. 2 as an example embodiment, the flow diagram includes the client device 202a, the communication network 204, the plurality of connected devices 238a, the connected device 238b, the base station 240 and the local network 242. The process 500 also includes the services 206 as shown and described with reference to FIG. 2 and including any or all of the modules illustrated and described concerning the services 106 of FIG. 1. According to one embodiment, execution of the process 500 results in the process 400 being executed as illustrated and described with reference to FIG. 4.

According to one embodiment, the local network 242 includes Wi-Fi at the host facility 230 and may also include one or more personal area networks. Depending on the embodiment, the personal area networks can include wireless personal area networks such as Bluetooth or IEEE 802.15.4 (i.e., Zigbee or Atmel LwMesh). In one embodiment, the base station 240 includes an integral wireless Wi-Fi transceiver that allows the base station to transmit and receive information across the communication network 204 via the local network 242. According to another embodiment, the base station 240 includes an integral cellular-connected device that allows the base station 240 to transmit and receive information across the communication network 204 without using the local network 242.

According to the illustrated embodiment, the plurality of connected devices 238a includes device-chargers with integral batteries. The integral batteries are charged when the connected devices 238a are coupled to the base station 240. A user (for example, the user 236 as illustrated in FIG. 2) receives a charger removed from the base station and employs the process 500 to activate the charger and charge the client device 202a, for example, using the connected device 238b selected from the plurality of connected devices 238a.

In the illustrated embodiment, the user initiates the process by completing a hardwired connection of the client device 202a to the connected device 238b, for example, plugging the client device 202a into the connected device 238b. An activation request is then transmitted from the connected device 238b to the base station 240 where it is communicated to the services 206. Communication is established between the client device 202a and the services 206. On the client device 202a, the user employs an application (for example, a web application or a native application) as an interface with the services 206. For example, the application can provide an interface as shown by the series of screens 402 in FIG. 4. Provided the user agrees to either engage with digital content or pay for the charge, an activation instruction is communicated from the services 206 to the base station 240 via the communication network 204 either alone or in combination with the local network 242. The base station 240 then communicates an activation signal to the connected device 238b via the local network 242.

According to one embodiment, an activation status is communicated to the services 206. The status is used to communicate whether the connected device 238b was successfully activated to provide the desired service (for example, to provide a power charge in the embodiment illustrated in FIG. 5). In a further embodiment, the activation status can also communicate whether the desired service was successfully performed in addition to whether the activation itself occurred.

In various embodiments, the activation status is communicated from the connected device 238b to the services via the communication network 204 either alone or in combination with the local network 242. In one embodiment, the connected device 238b communicates the activation status to the base station 240 which then communicates the activation status to the services 206 via the communication network. Where an "activation failed" status is communicated, the services 206 can authorize a further activation attempt of the connected device 238b, or alternatively, communicate to the client device 202a that the user should select an alternate connected device from among the plurality of connected devices 238a. Following a successful charge, the user returns the connected device 238a for connection to the base station 240 where the device 238a can be recharged.

In some embodiments, the acts of providing an ID code to the services to uniquely identify the connected device 238b and engagement by the user with digital content are included in the preceding. For example, the ID code can be communicated to the services either from the client device 202a, directly from the connected device 238a or from the base station 240 depending on the embodiment. According to one embodiment, the digital content is communicated to the client device 202a from the services and the charge is completed following an engagement by the user with the digital content. According to a further embodiment, the digital content is provided based on relevancy determined from any of the following either alone or in combination: user preferences; user profile; host facility preferences; host facility profile; and content provider preferences.

Figure 6:
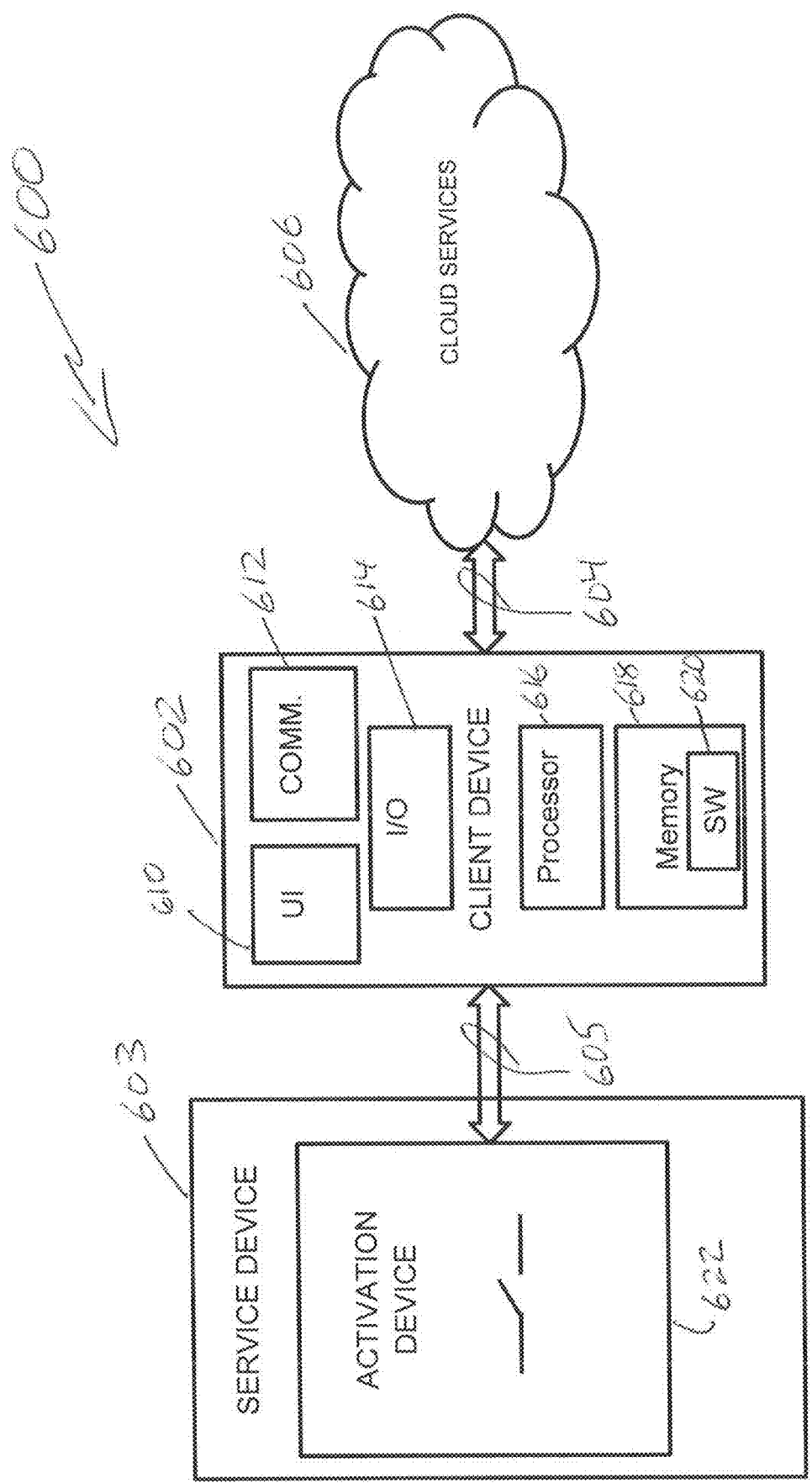
FIG. 6 illustrates a system employed to activate a device in accordance with one embodiment.

Referring now to FIG. 6 a system 600 for device activation is illustrated in accordance with one embodiment. The system 600 includes a client device 602, a service device 603, a first communication network 604, a second communication network 605 and services 606. The client device 602 may be of the sort shown and described with reference to FIGS. 1 and 2 and the client devices 102 and 202, respectively. The first communication network 604 may be of the sort illustrated and described with reference to FIG. 1 and the communication network 104. According to one embodiment, the first communication network 604 and the second communication network 605 are included in the same communication network. In another embodiment, the second communication network is of the sort illustrated and described with reference to FIGS. 2 and 5 and the local network 242. The services 606 may be of the sort illustrated and described with reference to FIG. 1 and the services 106, including any one or any combination of the modules illustrated and described concerning the services 106.

According to the illustrated embodiment, the client device 602 includes a user interface 610, a communication system 612, input/output ("I/O") devices 614, a processor 616 and a memory 618. The memory is configured to store software instructions 620.

In various embodiments, the user interface 610 can include a display, for example a touchscreen display. According to one embodiment, the user interface 610 includes a touchscreen display that can detect contact and movement or break thereof using any of a number of touch sensitivity technologies, including but not limited to capacitive, resistive, infrared, and surface acoustic wave technologies, as well as other proximity sensor arrays or other elements for determining one or more points of contact with display or proximity to the display. According to one embodiment, the display can be used to implement virtual or soft buttons and/or a keyboard or other display objects rendered in the display. In various embodiments, the user interface 610 can include a speaker, a microphone, a camera (including video cameras) or any combination of the preceding together or in combination with other devices and interfaces.

In various embodiments, the communication system 612 can include one or more wireless communication subsystems and one or more wired communication subsystems.

Wireless communication systems can include RF communication systems and/or optical communication systems such as IR communication systems. The RF communication systems can provide for local communication such as via Bluetooth communication and/or long-distance communication, for example, via cellular and/or satellite communication networks.

The client device 602 can also support hardwired communication systems in some embodiments, for example, communication via USB or other hardwired communication port included in the client device 600. Depending on the embodiment, the hardwired communication can allow the client device 600 to communicate with any of other client devices 102, connected devices 103, networks 104, services 106 and application servers 128 or other processing devices and/or systems capable of receiving and/or transmitting information.

In general, the client device 600 is not limited to any specific communication hardware and/or protocol. Thus, for example, the communication systems can support any of a (GSM) network, a GPRS network, an enhanced data GSM environment (EDGE) network, 802.x communication networks (e.g., Wi-Fi), 3G networks, 4G LTE networks, code division multiple access (CDMA) networks, a Bluetooth network, or other communication network depending on the embodiment.

The components included in the client device 600 can be coupled by one or more communication buses or signal lines. The communication buses can be used for the communication of instructions/commands and data between the illustrated components and between the illustrated components and other components included in the client device 600, depending on the embodiment.

In various embodiments, the I/O devices 614 can include any of a location and/or positioning device (for example, a GPS to determine location information associated with the client-device 600), an inertial sensing system or other motion sensing systems, a camera (for example, a video camera) and audio systems (for example, a microphone and/or speakers) as some examples. In some embodiments, the I/O devices 614 can include a mouse or trackball used to move the cursor within a GUI rendered in the display. According to further embodiments, an audio system can be employed with a speech recognition system to allow hands-free interaction with the client device 600.

In various embodiments, the processor 616 includes one or more processors, for example, a central processing unit and/or a graphics processing unit (GPU). According to one embodiment, the processor 616 is included in a microcontroller. The processor 616 includes software and can, for example, include all or a portion of the software instructions 620 or different software instructions.

In various embodiments, the memory 618 can include high-speed random access memory and/or non-volatile memory, such as RAM, EEPROM, flash memory, magnetic storage devices and optical storage devices. Depending on the embodiment, the client device 600 can include the memory 618 external to the processor 616, memory 618 internal to the processor 616 or a combination of each of the preceding. In further embodiments, the memory 618 can store operating system such as, LINUX, iOS, Android, WINDOWS or any other OS operating on the client device. The operating system can include instructions for handling basic system services and for performing hardware dependent tasks. According to one embodiment, the device-activation application is "platform agnostic" because it is provided as a web-based application suitable for operation using any web browser. Alternatively, the device-activation application can be configured to operate on the client device using a specific operating system in a selected embodiment.

In various embodiments, the memory 618 can also store communication instructions to facilitate communicating with one or more additional devices, one or more computers and/or one or more servers, for example, as described with reference to FIG. 1. In some embodiments, the memory 618 includes instructions for rendering the graphical user interface in the user interface 610, for example, where the graphical user interface can be employed by the user to reach the resources and services 106, 206, receive and engage with digital content and activate connected devices 103. According to these embodiments a variety of additional instructions can be included in the memory 618. For example, software instruction 620 can be provided for a variety of web browsing, media processing, telecommunications, camera and video related functions and GPS-enabled operations, as some examples.

Depending on the embodiment, the software instructions 620 can be implemented as individual software programs or modules, or combined with one or another in various configurations. Also depending on the embodiment, various functions of client device 600 can be implemented in hardware and/or in software, including in one or more signal processing and/or application specific integrated circuits.

According to the illustrated embodiment, the connected device 603 includes and an activation device 622. According to various embodiments, the connected device 603 is of the sort illustrated and described with reference to FIGS. 1 and 2 and embodiments of the connected devices 103, 238, 246, 248, and 254 in which the activation device is integral to the corresponding connected device.

In various embodiments, the activation device 622 includes one or more output elements, for example, as shown and described with reference to the output elements 247, 249 in FIG. 2. According to one embodiment, the activation device 622 includes at least one digital output. The digital output(s) are connected as input(s) to circuitry included in the connected device 603. Depending on the embodiment, digital outputs can include either or both of a digital logic output, or serial communication output for the communication of data between the activation device 622 and the connected device 603.

In general, the system 600 allows a user in possession of the client device 602 to communicate with the services 606 and/or the activation device 622 to activate the connected device 603 to deliver the service. According to one embodiment, the user must engage with digital content delivered to the client device 602 before the activation device 622 operates to activate the connected device 603. According to another embodiment, the user has a choice to either engage with the digital content and activate the connected device 603 at no cost, or pay for an activation of the connected device 603. According to yet another embodiment, the user has a choice to either engage with the digital content and activate the connected device 603 at a reduced rate, or pay the full rate to activate the connected device 603.

Depending on the embodiment, activation of the connected device 603 can include either or both of completing a power circuit to turn the connected device "ON" or activating a particular feature or service available using the connected device 603. Further, the "services" provided by the connected device can include the provisioning of goods. For example, the connected device 603 can include a vending machine that dispenses a beverage following an engagement with digital content delivered to the user. Other examples include: where the connected device 603 includes a lighting controller, an activation of color lighting to improve a user experience when compared with the conventional lighting; where the connected device 603 includes a thermostat or other temperature controller, providing control of a temperature setting of an HVAC system; and where the connected device 603 includes a printer, providing access to color printing.

As will be apparent to those of ordinary skill in the art in view of the preceding examples, activation of the connected device 603 can result in providing goods, services or upgrades to either. As further examples, activation of a connected device 603 at a point-of-purchase can result in free receipt of an item being sold at the point-of-purchase, or alternatively receipt of a more expensive item at no additional cost at the point-of-purchase.

As described above, various embodiments deliver digital content (for example, branded content) to client devices for engagement by the individual in possession of the client device before or concurrent with activation of the connected device. According to the illustrated embodiment, the digital content is received by the client device 602, for example, via delivery over the first communication network 604. The digital content is presented for engagement via the user interface 610. In various embodiments, the digital content can include audio, video, text, graphics or a combination of the any of the preceding and other formats suitable for presentation to a user. For example, the digital content can include data in any of a variety of file types. These include but are not limited to WAV files, GIF files, MP4 files, MPEG files, WMV files, JPEG files, PNG files, PDF files, HTML files, JAVASCRIPT files, and CSS files.

According to one embodiment, the engagement includes interaction with the client device 602 by the user. Features and functionality available via the user interface 610 and/or the I/O 614 of the client device 602 can be employed to detect user engagement, for example, active engagement by the user. In some embodiments, the application for example the software 620 records the engagement when detected via the user interface 610 and/or the I/O 614. Examples include: where the user interface 610 includes a touch screen, a touch-input to the touch screen; where the user interface 610 includes a microphone, a voice input received by the microphone; where the user interface 610 includes a GUI rendered in a display, a cursor input received by the GUI; where the I/O devices 614 include an inertial sensing system, a movement of the client device 602 detected by the inertial sensing system; and where the I/O devices 614 include a camera, a gesture captured by the camera.

Figure 7:
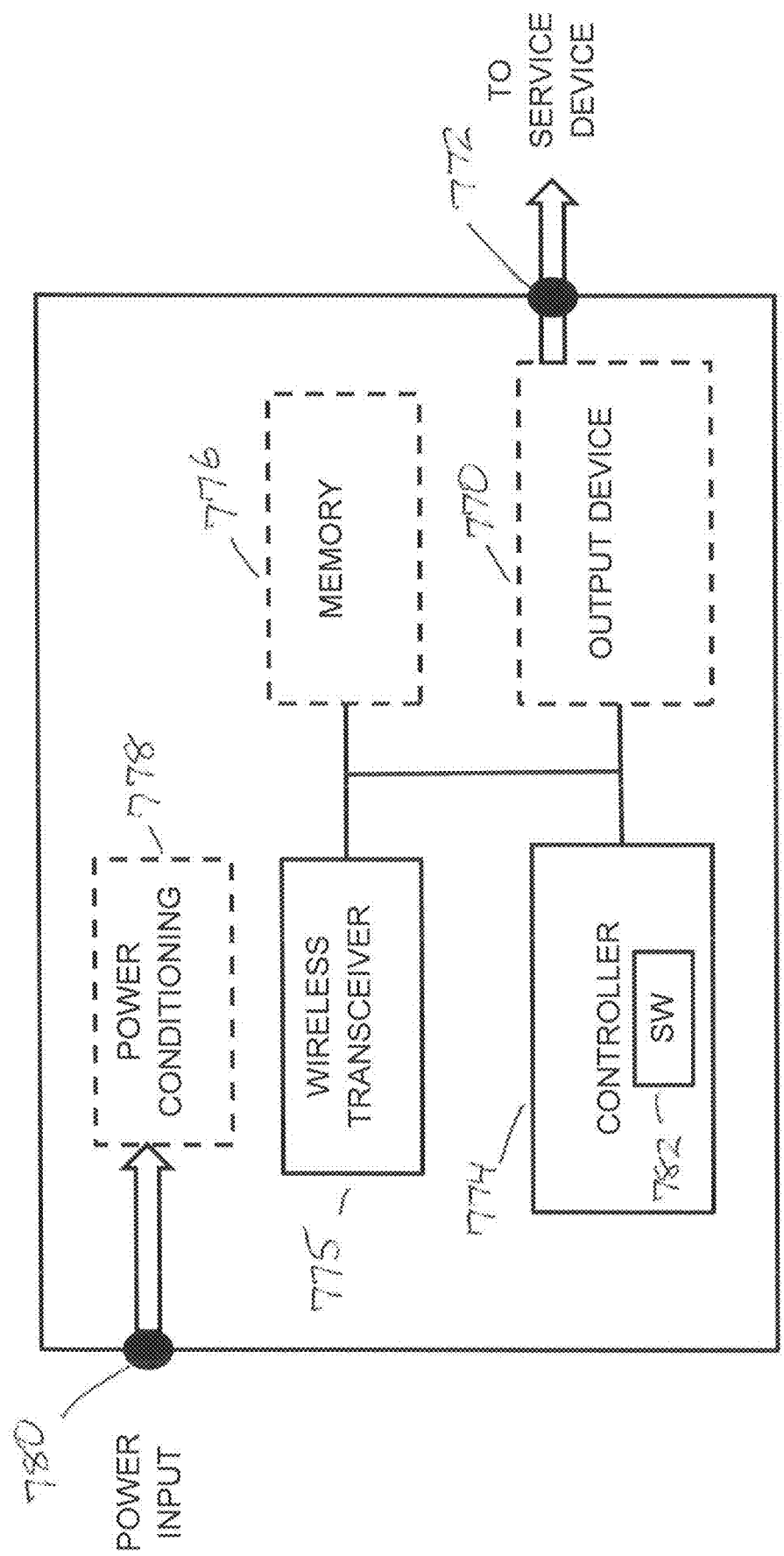
FIG. 7 illustrates a block diagram of an activation device in accordance with one embodiment.

Referring now to FIG. 7, an activation device 700 is illustrated in accordance with one embodiment. In the illustrated embodiment, the activation device 700 includes an output device 770, an output 772, a controller 774, a wireless transceiver 775, an external memory 776, power conditioning 778 and a power input 780. The controller 774 includes software instructions 782. Each of the external memory 776 and the power conditioning 778 are illustrated in phantom because they are optional depending on the embodiment. For example, the activation device 700 may only include memory internal to the controller 774 or both the external memory 776 and memory internal to the controller 774. In general, the controller 774 includes a processor. According to one embodiment, the controller includes a microcontroller.

Depending on the embodiment, the software instructions 782 can be implemented as individual software programs or modules, or combined with one another in various configurations. In various embodiments, the memory 776 can include high-speed random access memory and/or non-volatile memory, such as RAM, EEPROM, flash memory, magnetic storage devices and optical storage devices.

According to various embodiments, the activation device 700 is of the sort illustrated and described with reference to FIG. 6 and the activation device 622 in embodiments in which the activation device is integral to the corresponding connected device. In further embodiments, the activation device 700 can be provided as a standalone apparatus, for example, as illustrated and described with reference to the output element 264 of FIG. 2.

Depending on the embodiment, the output device 770 can include one or more digital outputs, one or more analog outputs or a combination of analog and digital outputs. In one embodiment, the digital output is implemented in transistor-transistor logic. Depending on the embodiment, the output device 770 can include either or both of a digital logic output and a serial communication output. These output(s) are connected via the output 772 to circuitry included in the connected device with which the activation device is employed. According to one embodiment, the output device 770 includes a conventional analog switch, for example, including a relay contact.

In various embodiments, the wireless transceiver 775 can include one or more wireless communication subsystems. The wireless transceiver 775 can include RF transceivers and/or optical transceivers such as IR communication systems. Where RF is employed, the wireless transceiver 775 can provide for local communication such as via Bluetooth communication and/or long-distance communication, for example, via cellular and/or satellite communication networks. In general, the wireless transceiver 775 is not limited to any specific communication hardware and/or protocol. Thus, for example, the wireless transceiver 775 can support any of a (GSM) network, a GPRS network, an enhanced data GSM environment (EDGE) network, 802.x communication networks (e.g., Wi-Fi), 3G networks or 4G LTE networks, code division multiple access (CDMA) networks, a Bluetooth network, or other communication network depending on the embodiment. According to one embodiment, the wireless transceiver 775 is configured for communication via a private area wireless network topology based on one of IEEE 802.15.4, WIFI and/or Bluetooth technology. According to embodiments that employ RF communication, the wireless transceiver 775 includes an antenna.

In FIG. 7, the output device is illustrated in phantom because it can either be a standalone component included in the activation device 700 or alternatively included in the controller 774. According to the later embodiment, an output included in the controller 774 is connected to the output 772. For example, the controller 774 can include a digital output for connection to the output 772. According to one embodiment, the controller 774 and the wireless transceiver 775 are included in a single component, for example, as provided in an Atmel ATmega256RFR2 ZigBit (for IEEE 802.15.4 communication) or an Atmel SAMB11 (for Bluetooth communication).

According to one embodiment, the power input 780 is connected to a source of power included in the connected device with which it is employed. Further, while the illustrated embodiment includes the power input 780 for connection to a source of power, external to the activation device 700, the activation device 700 can include an integral battery either as a backup or as the sole source of power for the activation device 700.

Power conditioning 778 is provided where, for example, the source of power connected to the input 780 does not match the requirements of the activation device 700. For example, the voltage of the power source may not match the voltage required by the hardware included in the activation device 700. In accordance with one embodiment, the power conditioning 778 includes electronic circuitry. According to a further embodiment, the power conditioning 778 includes a software program or other instructions.

The components included in the activation device 700 can be coupled by one or more communication buses or signal lines. The communication buses can be used for the communication of instructions/commands and data between the illustrated components and between the illustrated components and other components included in the activation device 700 depending on the embodiment. Further, the activation device 700 can include one or more power busses that are connected to components included in the activation device 700.

Also depending on the embodiment, various functions of activation device 700 can be implemented in hardware and/or in software, including in one or more signal processing and/or application specific integrated circuits. According to one embodiment, the activation device includes a printed circuit board configured as a "daughter" board that is installed by connecting the board to a mother board included in the connected device. The preceding approach can provide a direct connection of the activation device 700 to the connected device at either or both of the output 772 and the power input 780.

In operation, the activation device 700 operates in combination with the client device 102 and the connected device 103 to implement activation control for the connected device. According to some embodiments, activation is contingent on an engagement with digital content provided to the requestor. These approaches can provide an opportunity for brands and brand managers to deliver relevant digital content for immediate impact to customers or potential customers. According to some embodiments, the immediacy of the message is achieved because the message is received by the requestor at a point-of-purchase and/or at a venue where the branded goods or services are sold. Embodiments described herein also achieve an increased impact because they can require an active engagement by the requestor. For example, to receive a device activation at no cost, a user can be required to employ the client device 103 in a manner that provides positive evidence that the user engaged with the digital content.

In one embodiment, the connected device is located at a bar or restaurant that serves beer. Here, a free device activation can include the transmission of an interactive video to the requestor's client device. In this example, the video may include dispensing a "cold" beer into a branded glass. The user can be required to control the orientation of the client device to try an avoid overfilling the glass. Confirmation of the interaction is communicated to the services and the device activation occurs. This example demonstrates an interaction between the requestor and branded content via a "virtual activity" at a location that sells the brand that appears in the digital content. Other examples include: geo-fencing within stores to guide users to a particular aisle; taking a selfie or using a pre-existing photo to choose and apply a makeup color in virtual reality; the use of augmented reality/vision to show arrows or other indications to identify those products in a large box store that are of greatest interest/relevance; and scanning of a particular product's barcode for delivery of a coupon that can be used on that product and/or other items.

As mentioned above with reference to the services 106 illustrated and described with reference to FIG. 1, embodiments employ one or more tools to increase the relevancy of the digital content. The preceding can deliver benefits to any one or all of the requestor, the content provider and the host facility. In general, these approaches employ one or more of the relevancy modules 114, 117 and 120 in the process of digital content selection. Additionally, information provided by other modules, for example, the end user interface module 111 and the end user engagement analyses module 112 is also employed in the digital content selection for distribution. Because the amount of data that is stored (and analyzed) by the services 106 increases over time, the services can deliver increasing relevant content over time. The information that is analyzed to increase the relevancy of the digital content which is distributed can include: user demographics; user preferences; host facility profiles (for example, goods and services available at the facility that hosts connected devices, the nature and type of business at the host facility; content preferences of the host facility); digital content provider profiles (for example, targeted customer demographics, goods/services provided by the content provider, represented brands); connected device usage patterns; and macro-patterns that drive behavior. A number of additional examples are provided below.

In one embodiment, a digital content provider knows that their brand (a craft summer ale) is most successful when advertised to users who are 21+, enjoy the finer things in life, and spend time at an upscale bar at 5 PM on a Friday. Consequently, their content is distributed to the venue on Friday afternoon/early evening to users seeking to activate a connected device located at the upscale bar. The user engages in the advertisement and agrees that a crisp, refreshing craft summer ale from the brand represented in the digital advertisement is a perfect refreshment to order at the host facility the next time the bartender comes around to the cabana. As a result, the user happily enjoys a fresh craft beer at a rooftop bar. The content provider is pleased to have suggested a relevant product at a relevant time, because the digital content leads to an immediate, physical sale. The host facility is happy because they made a sale and are developing a better relationship with their patrons and suppliers. According to one embodiment, the services 106 employ at least the digital content relevancy module 115 to achieve the relevancy described in this example.

According to another embodiment, a user is interested in activating a connected device to receive goods or services. The user employs the device-activation app with their client device and receives an option to either pay $1 to activate the charger's power or engage with digital content from MICROSOFT. The user opts to engage with the content and is prompted with three survey questions that ask for an anonymous sharing of preferences. When the user completes the survey they receive a free power activation sponsored by MICROSOFT.

The user is pleased to receive a free device activation (for example, activation of a power charger). The user may also be curious how MICROSOFT is using this information and may visit their website for more information. For example, the device activation application may include a link to the web site at the end of the experience. The content provider is pleased because a new user is engaged and interested with their brand. In addition, the content provider receives valuable data from a user. The host facility has built goodwill by making a free charge available to their customer.

According to another embodiment, a music production company uploads songs to the services 106, for example, via the content provider interface module 113. The content provider also employs the content provider interface module 113 to refine the audience to music lovers. The targeted users are offered an option to either pay $1 for a device activation only or $1 for a song and the device activation. The user receives an opportunity to choose one of three songs to download based on the demographics of the user.

The user is quite happy to receive both a device activation and a free download of music of interest. The content provider is pleased because they are distributing new music. In addition, the user's selection can be employed to further improve the relevancy of the digital content (i.e., the music offerings) in the future. For example, for this user, there is no need to offer the downloaded song again. In addition, the content provider better understands the individual user's musical taste. For the broader user base, the user's selection can be cumulatively indicative of current musical tastes.

Further examples demonstrate how operation of the end user interface module 111 can be employed to increase the relevancy of the digital content distributed to users who request device activation. According to one embodiment, a user enters their general preferences to refine the digital content she will receive to reflect her personal interests. As a result, the user has an increased enjoyment with the digital content they receive and engage with as a part of the device activation process. Further embodiments allow the user to provide feedback (for example, provide a "star" rating review, or a thumbs up/thumbs down) following the receipt of the digital content. The preceding can increase the goodwill user's feel toward the host facility, product and any of the brand(s) or messaging represented in the digital content.

Figure 8:
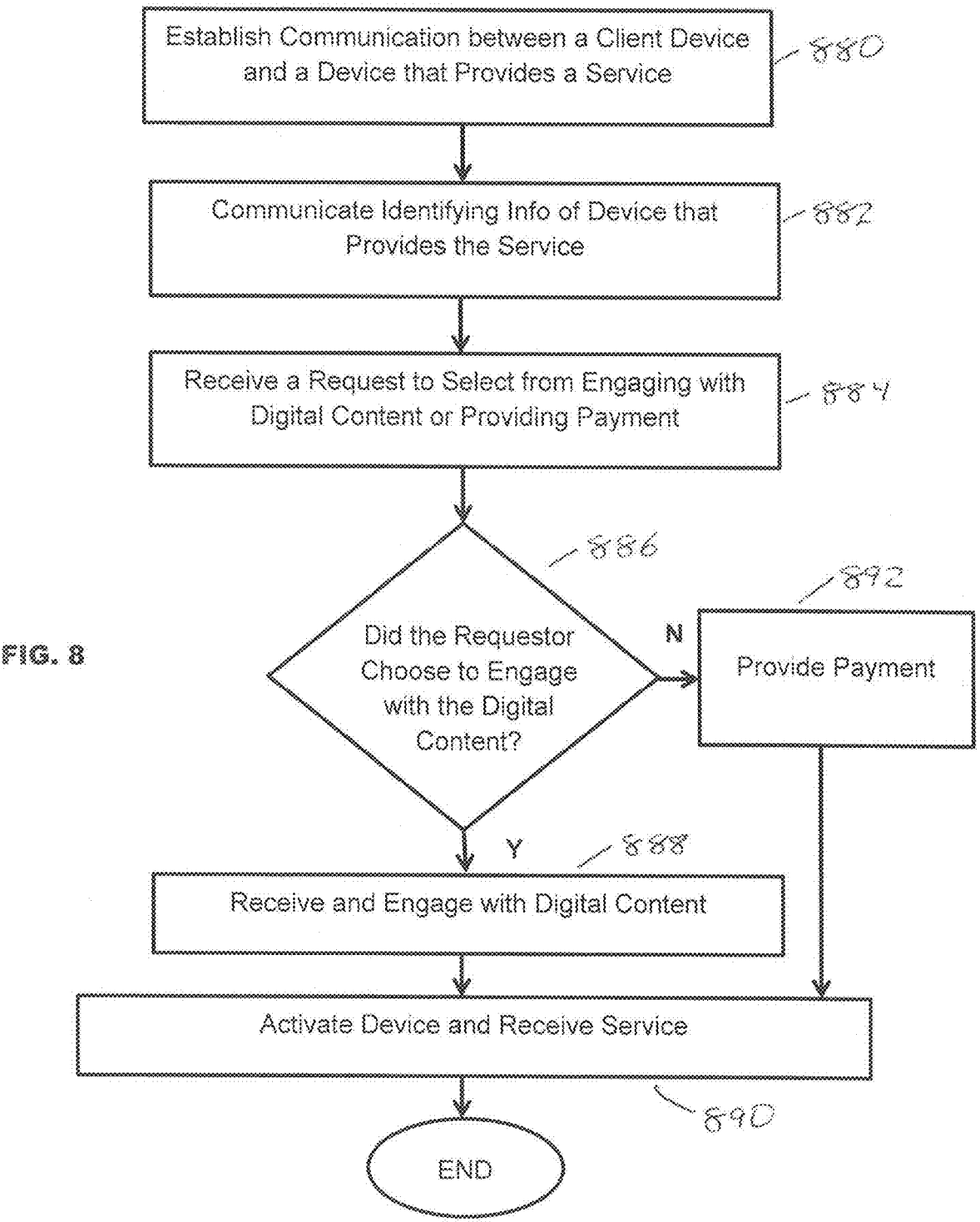
FIG. 8 illustrates a flow diagram of a process to activate a device in accordance with one embodiment.

Referring to FIG. 8, a process 800 for activating a device that provides a service is illustrated in accordance with one embodiment. In some embodiments, the process 800 is accomplished, in part and with reference to FIG. 1, by the communication of information between the client device 102, the connected device 103 and the services 106. Reference to FIG. 1 is by way of example only. The process 800 can also be employed with the apparatus, systems and methods shown and described with reference to FIGS. 2-7. Further, while the connected device is referred to as a device that provides a service in the process 800, the "service" can include providing goods to the requestor via activation of the connected device as described elsewhere herein.

The process 800 begins at act 880 where communication is established between the client device and the device that provides the service. According to one embodiment, the communication is established via a private area network such as Bluetooth. With communication established, an ID code or other information that uniquely identifies the device that provides the service is communicated at act 882 to, for example, the services 106. Communication can occur directly from the device that provides the service to the remote cloud-based services, or alternatively, from the device that provides the service to the services 106 via the client device. In an alternate embodiment, the user in possession of the client device enters the identifying information into the client device for communication to the remote cloud based services 106. In still another embodiment, the device that provides the service is identified via geo-location. Depending on the embodiment, this is achieved using information provided by a GPS system included in the client device, the known location of the device that provides the service or a combination of the preceding. According to some embodiments, the geo-location information is sufficient to uniquely identify the connected device for activation and communication of an ID code or other device-specific information is not necessary.

At act 884, the client device receives a request concerning how the user will activate the device. In the illustrated embodiment, the options include engaging with digital content and paying for the device activation as explained in greater detail elsewhere herein.

At act 886, the user replies to the request. If the user elects to choose an engagement with digital content the process 800 moves to act 888. Alternatively, if the user elects to provide payment, instead, the process moves to act 892.

At act 888, the user receives digital content from the services. The user also engages with the content. As described elsewhere herein, the engagement can include an active engagement or a passive engagement depending on the embodiment. The process 800 moves to act 890 following act 888.

Alternatively, the user replies to the request at act 886 by choosing to pay for the device activation. As a result, the process 800 moves to act 892. At act 892, the user provides payment. Act 892 can include any of: an authorization by the user to use a payment option already of record; or to provide new account details as required for payment processing. In one embodiment, the services process the authorized form of payment to provide an approval prior to proceeding to act 890.

At act 890, the connected device is activated and the user receives the services provided by the connected device. According to one embodiment, the process 800 results in a one-time device activation. In this embodiment, a repeated activation of the connected device by the user or another individual requires that the process 800 be repeated.

Although embodiments described herein refer to branded content, brands and brand managers, these approaches are not restricted to brands in the traditional sense. For example, the approaches described herein can provide opportunities for any content creator whether an individual, a non-profit or a commercial entity to deliver relevant digital content to end users at a location and time that provide the greatest impact.

Although illustrated as a combination of specialized hardware and software, various aspects of the system 100 such as the application, and/or services can be implemented as specialized software executing in a general purpose computing device such as a PC, a laptop, a tablet computer or other handheld computing device. Each of the client device and the connected device can include, for example, a processor connected to one or memory devices, such as a disk drive, flash drive, memory or other device for storing data. Depending on the embodiment, each of the client device and the connected device can communicate over hardwired or wireless communication interfaces with one or more other devices including, for example, the services. Accordingly, any of the embodiments described herein can include a non-transitory computer readable medium in which instructions are stored that when executed by a processing system implement aspects described herein.

Further, aspects can be implemented with a specially-programmed, special purpose hardware, for example, an application-specific integrated circuit (ASIC). Aspects of the invention can be implemented in software, hardware or firmware or any combination thereof. Such methods, acts, apparatus, systems, system elements and components thereof may be implemented as part of the computing system described above or as an independent component or components.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method to engage an individual with digital content to activate a device configured to provide a service, the method comprising:
    wirelessly receiving, with the device in a first state that prevents the service from being provided, a request from a requestor to place the device in a second state to provide the service;
    offering the requestor an opportunity to place the device in a second state following their assent to engage with the digital content, the device configured to provide the service when in the second state;
    when the requestor chooses to engage with the digital content to receive the service, wirelessly signaling the device to activate a change from the first state to the second state;
    when the requestor chooses to pay to receive the service rather than receive the digital content, requesting a form of payment be received from the individual and if the form of payment is approved, wirelessly signaling the device to activate a change from the first state to the second state; and
    maintaining the device in the first state to prevent the service from being provided if both the requestor does not engage with the digital content and the form of payment is not received and approved.

2. The method of claim 1, further comprising providing the service as an upgrade relative to a free-service provided by the device.

3. The method of claim 1, wherein the requestor possesses a client device at a first location that is proximate to the device configured to provide the service, and wherein the method further comprises:
    providing remote resources including the digital content at a second location that is geographically remote from the first location;
    wirelessly communicating an identification code to the remote resources, the identification code identifying the device configured to provide the service; and
    selecting, by the remote resources, the digital content, at least in part, based on the identification code.

4. The method of claim 3, wherein the act of selecting further comprises selecting, by the remote resources, the digital content based, at least in part, on goods or services available for purchase at the first location.

5. The method of claim 4, wherein the act of selecting further comprises:
    selecting, by the remote resources, the digital content based, at least in part, on at least one piece of demographic information concerning the requestor; and
    selecting the at least one piece of demographic information from at least one of an age of the requestor, a gender of the requestor, a prior purchase of goods or services made by the requestor and a known interest of the requestor.

6. The method of claim 4, further comprising:
    verifying, by the remote resources, a completion of the engagement with the digital content; and
    wirelessly communicating a device activation signal from the remote resources to the device configured to provide the service via the client device following a completion of the engagement.

7. The method of claim 6, further comprising wirelessly communicating a status message from the client device to the remote resources, the status message indicating whether the device was successfully activated.

8. The method of claim 3, further comprising receiving, by the remote resources, information concerning at least one interest or habit of the requestor,
    wherein the act of selecting further comprises selecting, by the remote resources, the digital content based, at least in part, on the at least one interest or habit.

9. The method of claim 3, further comprising determining, by the remote resources, the first location based on at least one of a location associated with the device configured to provide the services as identified by the identification code and geolocation information provided by the client device.

10. The method of claim 3, further comprising detecting, by the client device, the device configured to provide the service and the identification code when the client device is located proximate the device configured to provide the service.

11. The method of claim 3, further comprising establishing a user input received by the client device during a display of the digital content on the client device as a completion of the engagement.

12. The method of claim 11, further comprising selecting the user input from at least one of a touch input, a voice input, a visual input, a cursor input and a movement of the client device.

13. The method of claim 1, further comprising:
    selecting, for display to the requestor, the digital content from at least one of an image and a video; and
    including an identification of a brand in the digital content, the brand selected based on at least one of a location of the device configured to provide the service and at least one piece of demographic information concerning the requestor.

14. The method of claim 1, further comprising:
    if the requestor agrees to engage with the digital content, wirelessly communicating digital content for engagement by the requestor; and
    changing the state of the device to place the device in the second state to allow the device to provide the service following a completion of the requestor's engagement with the digital content.

15. The method of claim 1, further comprising:
    identifying an engagement with the digital content via an activity detected by a client device in possession of the requestor; and
    communicating a confirmation of the engagement with the digital content from the client device to the device that provides the service.

16. A method of delivering digital content to a client device in possession of an individual, the method comprising:
    configuring a device that provides a service for a plurality of operating states including a first state that allows a delivery of a first service but not a second service by the device that provides a service and a second state that allows the delivery of the second service by the device that provides the service, the second service providing an upgrade relative to the first service;
    offering the individual an opportunity to place the device that provides the service in the second state following engagement with the digital content via the client device; when the digital content is engaged with via the client device, wirelessly communicating to the device that provides the service an authorization to change an operating state of the device from the first state to the second state;

signaling the device to activate the change from the first state to the second state; and identifying the engagement with the digital content via a virtual activity detected by the client device.

17. The method of claim 16, further comprising identifying the engagement with the digital content by detecting, with the client device, at least one of: a touch-input to a touch screen included in the client device; a voice input received by a microphone included in the client device; a cursor input received by a graphical user interface included in the client device; a movement of the client device detected by an inertial sensing system included in the client device; and a gesture captured by a camera included in the client device.

18. The method of claim 16, further comprising communicating a confirmation of an engagement with the digital content from the client device to the device that provides the service.

* * * * *